(12) United States Patent
Hornsby et al.

(10) Patent No.: US 11,726,983 B2
(45) Date of Patent: *Aug. 15, 2023

(54) DATABASE AND SYSTEM ARCHITECTURE FOR ANALYZING MULTIPARTY INTERACTIONS

(71) Applicant: PFFA Acquisition LLC, Cincinnati, OH (US)

(72) Inventors: Neil Hornsby, Cincinnati, OH (US); Ian T. Perks, Loveland, OH (US); Khaled Elsayed, London (GB); Nathaniel Jahnke, Cincinnati, OH (US)

(73) Assignee: PFFA Acquisition LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,981

(22) Filed: Nov. 10, 2022

(65) Prior Publication Data

US 2023/0079952 A1 Mar. 16, 2023

Related U.S. Application Data

(63) Continuation of application No. 17/063,468, filed on Oct. 5, 2020, now Pat. No. 11,507,564, which is a
(Continued)

(51) Int. Cl.
*G06F 16/00* (2019.01)
*G06F 16/23* (2019.01)
(Continued)

(52) U.S. Cl.
CPC ...... *G06F 16/2365* (2019.01); *G06F 16/2282* (2019.01); *G06F 16/24554* (2019.01); *G06F 16/24578* (2019.01)

(58) Field of Classification Search
None
See application file for complete search history.

(56) References Cited

U.S. PATENT DOCUMENTS 4,918,603 A * 4/1990 Hughes ............... G09B 19/00
463/4
6,545,689 B1 4/2003 Tunli
(Continued)

OTHER PUBLICATIONS

Bhandari et al.; "Advanced Scout: Data Mining and Knowledge Discovery in NBA Data"; 1997; Kluwer Academic Publishers; Data Mining and Knowledge Discovery; vol. 1, Issue 1; pp. 121-125 (Year: 1997) (Year: 1997).*
(Continued)

*Primary Examiner* — Polina G Peach
(74) *Attorney, Agent, or Firm* — Armstrong Teasdale LLP

(57) ABSTRACT

An analytics engine (AE) computing system for analyzing and evaluating data in real-time associated with a performance of parties interacting within a multi-party interaction is provided. The AE system is configured to receive interaction data from a data validation (DV) computing device, retrieve contextual data from a contextual data source, determine a task identifier, and calculate a task score. The AE system is also configured to retrieve normalization model data from a normalization database, compare a plurality of normalization rules to the validated interaction data and the contextual data, and determine at least one normalization factor applies to the task score. The AE system is further configured to normalize the task score based on the at least one normalization factor, calculate an aggregate score using the normalized task score, and store the validated interaction data, the normalized task score, and the aggregate score in an analysis database.

20 Claims, 12 Drawing Sheets

Related U.S. Application Data continuation of application No. 15/694,462, filed on Sep. 1, 2017, now Pat. No. 10,831,743.

(60) Provisional application No. 62/382,997, filed on Sep. 2, 2016.

(51) Int. Cl.
| | | |
|---|---|---|
| *G06F 16/22* | (2019.01) | |
| *G06F 16/2455* | (2019.01) | |
| *G06F 16/2457* | (2019.01) | |
| *G06F 16/30* | (2019.01) | |

(56) References Cited

U.S. PATENT DOCUMENTS

| | | | | |
|---|---|---|---|---|
| 7,618,312 | B1* | 11/2009 | Kasten | A63F 13/798 |
| | | | | 463/7 |
| 7,668,746 | B2 | 2/2010 | Eisma | |
| 7,949,295 | B2* | 5/2011 | Kumar | F41J 5/10 |
| | | | | 434/21 |
| 8,099,182 | B1* | 1/2012 | Kasten | A63F 13/828 |
| | | | | 463/9 |
| 9,378,251 | B2 | 6/2016 | Kendrena | |
| 9,727,622 | B2 | 8/2017 | Kara | |
| 9,849,361 | B2* | 12/2017 | Coza | G09B 19/0038 |
| 9,892,320 | B2* | 2/2018 | Oguchi | G11B 27/034 |
| 9,972,103 | B2 | 5/2018 | de Castro Alves | |
| 10,120,907 | B2 | 11/2018 | de Castro Alves | |
| 10,159,888 | B2* | 12/2018 | Lanni | H04W 4/029 |
| 10,198,515 | B1 | 2/2019 | White | |
| 10,204,300 | B2 | 2/2019 | Lucey | |
| 10,679,137 | B2* | 6/2020 | Villa | G06N 7/01 |
| 10,983,982 | B2* | 4/2021 | Christian | G06F 16/258 |
| 2002/0016791 | A1* | 2/2002 | Palmer | G06Q 10/10 |
| 2007/0033060 | A1 | 2/2007 | Gopalan | |
| 2008/0269644 | A1 | 10/2008 | Ray | |
| 2008/0281444 | A1 | 11/2008 | Krieger | |
| 2009/0210078 | A1 | 8/2009 | Crowley | |
| 2010/0030722 | A1 | 2/2010 | Goodson | |
| 2010/0228524 | A1 | 9/2010 | Bain | |
| 2011/0173235 | A1 | 7/2011 | Aman | |
| 2011/0237317 | A1 | 9/2011 | Noonan | |
| 2012/0053959 | A1* | 3/2012 | Sengupta | G16H 10/60 |
| | | | | 706/54 |
| 2012/0064956 | A1 | 3/2012 | Das | |
| 2012/0158527 | A1* | 6/2012 | Cannelongo | H04N 21/2668 |
| | | | | 707/748 |
| 2012/0221486 | A1 | 8/2012 | Leidner | |
| 2013/0144888 | A1 | 6/2013 | Faith | |
| 2013/0173632 | A1 | 7/2013 | Birdwell | |
| 2014/0025442 | A1 | 1/2014 | Goodson | |
| 2014/0039651 | A1* | 2/2014 | Crowley | G16H 20/30 |
| | | | | 700/91 |
| 2014/0135956 | A1* | 5/2014 | Thurman | G09B 19/0038 |
| | | | | 700/91 |
| 2014/0135959 | A1* | 5/2014 | Thurman | A63B 69/002 |
| | | | | 700/91 |
| 2014/0244197 | A1 | 8/2014 | Boudreau | |
| 2015/0131845 | A1 | 5/2015 | Forouhar | |
| 2015/0148129 | A1 | 5/2015 | Austerlade | |
| 2015/0170077 | A1 | 6/2015 | Kara | |
| 2015/0248917 | A1 | 9/2015 | Chang | |
| 2015/0312497 | A1* | 10/2015 | Aldridge | H04N 25/768 |
| | | | | 348/157 |
| 2015/0317801 | A1* | 11/2015 | Bentley | G08B 21/043 |
| | | | | 382/107 |
| 2015/0332184 | A1* | 11/2015 | Osborn | G06Q 10/00 |
| | | | | 705/7.28 |
| 2015/0347952 | A1 | 12/2015 | Guan | |
| 2016/0110458 | A1 | 4/2016 | Colgrove | |
| 2017/0024912 | A1 | 1/2017 | de Castro Alves | |
| 2017/0060651 | A1 | 3/2017 | Falter | |
| 2017/0109015 | A1* | 4/2017 | Krasadakis | G06F 16/335 |
| 2017/0169090 | A1* | 6/2017 | Jose | G06F 16/27 |
| 2018/0018330 | A1 | 1/2018 | Cohen | |

OTHER PUBLICATIONS

Solieman, Osama K. "Data mining in sports: A research overview." Dept. of Management Information Systems (2006). (Year: 2005).*

UmaMaheswari, P., and M. Rajaram. "A novel approach for mining association rules on sports data using principal component analysis: For cricket match perspective." 2009 IEEE International Advance Computing Conference. IEEE, 2009. pp. 1074-1080. (Year: 2009) (Year: 2009).*

Beetz, Michael, Bernhard Kirchlechner, and Martin Lames. "Computerized real-time analysis of football games." IEEE pervasive computing 4.3 (2005): 33-39. (Year: 2005) (Year: 2005).*

Faisal I. Bashir "Real-Time Motion Trajectory-Based Indexing and Retrieval of Video Sequences", 2007, IEEE.

Koller et al., Real-time Vision-Based Camera Tracking for Augmented Reality Applications, 1997 [retrieved Apr. 5, 2017], 1997 Proceedings of the ACM Symposium on Virtual Reality Software and Technology, pp. 87-94. Retrieved from the Internet: http ://dl.acm.org/citation. cfmid=261152 (Year: 1997).

PCT International Search Report and Written Opinion, Application No. PCT/US17/49947, dated Nov. 9, 2017, 10 pps.

* cited by examiner

DATABASE AND SYSTEM ARCHITECTURE FOR ANALYZING MULTIPARTY INTERACTIONS

CROSS-REFERENCE TO RELATED APPLICATIONS

This application is a continuation of U.S. patent application Ser. No. 17/063,468, filed Oct. 5, 2020, entitled "DATABASE AND SYSTEM ARCHITECTURE FOR ANALYZING MULTIPARTY INTERACTIONS," which issues as U.S. Pat. No. 11,507,564 on Nov. 22, 2022, which is a continuation of U.S. patent application Ser. No. 15/694,462, filed Sep. 1, 2017, entitled "DATABASE AND SYSTEM ARCHITECTURE FOR ANALYZING MULTIPARTY INTERACTIONS," which issued as U.S. Pat. No. 10,831,743 on Nov. 10, 2020, which claims the benefit of priority to U.S. Provisional Patent Application Ser. No. 62/382,997, filed Sep. 2, 2016, entitled "SYSTEMS AND METHODS FOR ANALYZING PERFORMANCE IN TEAM ENVIRONMENTS," the entire contents and disclosure of which are hereby incorporated by reference in their entirety.

BACKGROUND

The field of the disclosure relates generally to analysis of multi-party interactions, and more particular, to networked-based systems and methods for analyzing and evaluating data in real-time associated with a performance of parties interacting within a multi-party interaction.

In some multi-party interactions, such as in sports, in competitions, and even in workplaces, statistics and other performance analytics are used to provide a quantitative measurement of a party or a multi-party's performance of a job or specific task. The quantitative measurement may be used to supplement qualitative performance analysis of a party to better assess how well the party has performed a particular task. Performance analysis is typically performed by collecting data associated with a candidate party and analyzing the data to evaluate and/or rank particular tasks and other events from the data.

At least some multi-party interactions may be difficult to evaluate and quantify the performance of a party interacting within the multi-party. In some of these cases, only a portion of the data from the interaction is analyzed to generate performance statistics. This can greatly limit the evaluation. These limited statistics may not capture the entirety of the party's performance and therefore the statistics may cause misleading conclusions to be prematurely made. For example, in sports, common statistics collected during a football game for each player may only be collected during some plays and may not represent a player's performance throughout the entire game. As such, the player's performance may be analyzed on a subset of the available data, thus producing a limited assessment of the player's performance. In addition, when comparing a player's performance to other player's performance, it can be difficult to evaluate many difficult variables associated with difficult plays. In other words, comparing two different players from different teams, running different plays can be extremely difficult due to the number of variable on each play even if both players play substantially the same position. The ability to normalize these evaluations is needed. Accordingly, there is a need for providing a performance analysis system having enhanced data acquisition, data analysis, and performance evaluation capabilities that is configured to analyze in real-time a performance of a party and/or a multi-party interaction.

BRIEF DESCRIPTION

In one aspect, an analytics engine (AE) system for analyzing and evaluating data in real-time associated with a performance of parties interacting within a multi-party interaction is provided. The AE system includes at least one analytics engine (AE) computing device that includes a processor communicatively coupled to a memory and is configured to electronically receive validated interaction data from a data validation (DV) computing device, wherein the validated interaction data includes at least a real-time data source identifier, a party identifier, task measurement data, and at least one category identifier. The AE computing device is also configured to retrieve contextual data from a contextual data source based on the party identifier in the validated interaction data wherein the contextual data includes at least an interaction identifier. The AE computing device is further configured to determine a task identifier, based at least in part on the party identifier, the interaction identifier, and the at least one category identifier, calculate a task score using the contextual data and the task measurement data wherein the task score is associated with the task identifier, and retrieve normalization model data from a normalization database based at least in part on the at least one category identifier wherein the normalization model data includes a plurality of normalization rules and a plurality of normalization factors. The AE computing device is also configured to compare the plurality of normalization rules to the validated interaction data and contextual data, determine, based on the comparison, at least one normalization factor of the plurality of the normalization factors applies to the task score, normalize the task score based on the at least one normalization factor, calculate an aggregate score using the normalized task score, and store the validated interaction data, the normalized task score, and the aggregate score in an analysis database based on the task identifier wherein the analysis database is partitioned based at least in part on a party identifier and a task identifier.

In another aspect, a computer-implemented method for analyzing and evaluating data in real-time associated with a performance of parties interacting within a multi-party interaction is provided. The method is performed using an analytics engine (AE) computing device that includes at least one processor in communication with at least one memory device. The method includes electronically receiving validated interaction data from a data validation (DV) computing device wherein the validated interaction data includes at least a real-time data source identifier, a party identifier, task measurement data, and at least one category identifier. The method also includes retrieving contextual data from a contextual data source based on the party identifier in the validated interaction data wherein the contextual data includes at least an interaction identifier. The method further includes determining a task identifier, based at least in part on the party identifier, the interaction identifier, and the at least one category identifier, calculating a task score using the contextual data and the task measurement data wherein the task score is associated with the task identifier, and retrieving normalization model data from a normalization database based at least in part on the at least one category identifier wherein the normalization model data includes a plurality of normalization rules and a plurality of normalization factors. The method also includes comparing the plurality of normalization rules to the validated interaction data and the contextual data, determining, based on the comparison, at least one normalization factor of the plurality of the normalization factors applies to the task score, normalizing the task score based on the at least one normalization factor, calculating an aggregate score using the normalized task score, and storing the validated interaction data, the normalized task score, and the aggregate score in an analysis database based on the task identifier wherein the analysis database is partitioned based at least in part on a party identifier and a task identifier.

In yet another aspect, a non-transitory computer readable medium that includes executable instructions for analyzing and evaluating data in real-time associated with a performance of parties interacting within a multi-party interaction is provided. When the computer executable instructions are executed by an analytics engine (AE) computing device that includes at least one processor in communication with at least one memory device, the computer executable instructions cause the AE computing device to electronically receive validated interaction data from a data validation (DV) computing device wherein the validated interaction data includes at least a real-time data source identifier, a party identifier, task measurement data, and at least one category identifier. The computer executable instructions also cause the AE computing device to retrieve contextual data from a contextual data source based on the party identifier in the validated interaction data wherein the contextual data includes at least an interaction identifier. The computer executable instructions further cause the AE computing device to determine a task identifier, based at least in part on the party identifier, the interaction identifier, and the at least one category identifier, calculate a task score using the contextual data and the task measurement data wherein the task score is associated with the task identifier, and retrieve normalization model data from a normalization database based at least in part on the at least one category identifier wherein the normalization model data includes a plurality of normalization rules and a plurality of normalization factors. The computer executable instructions also cause the AE computing device to compare the plurality of normalization rules to the validated interaction data and contextual data, determine, based on the comparison, at least one normalization factor of the plurality of the normalization factors applies to the task score, normalize the task score based on the at least one normalization factor, calculate an aggregate score using the normalized task score, and store the validated interaction data, the normalized task score, and the aggregate score in an analysis database based on the task identifier wherein the analysis database is partitioned based at least in part on a party identifier and a task identifier.

BRIEF DESCRIPTION OF THE DRAWINGS

FIG. 10 illustrates an example user interface for inputting base data associated with a football game.

FIG. 11A illustrates a first example user interface to display party data associated with an interaction.

DETAILED DESCRIPTION

Figure 1:
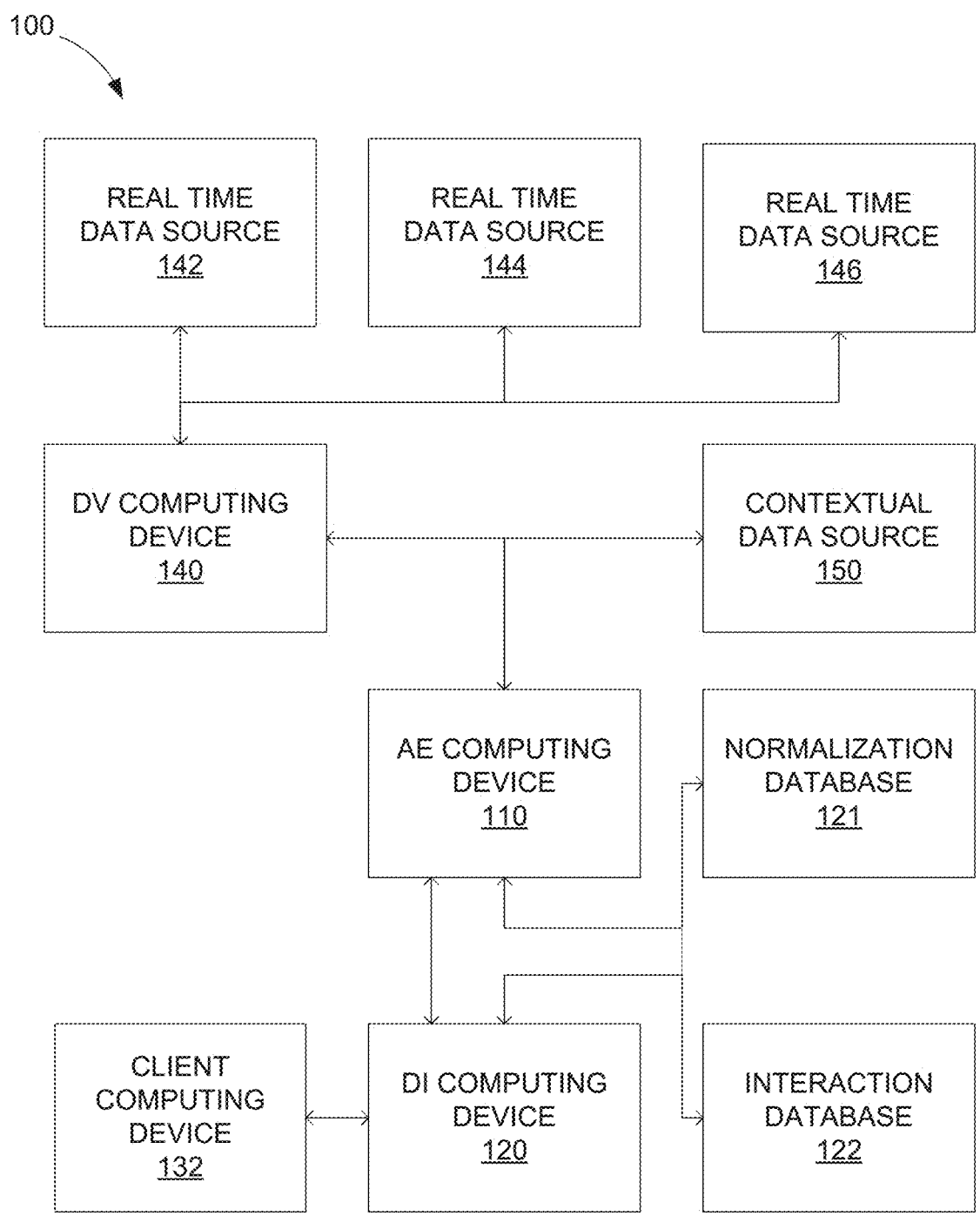
FIG. 1 is block diagram of an analytics engine (AE) system for analyzing and evaluating a data in real-time associated with a performance of parties interacting within a multi-party interaction.

The systems and methods described herein relate generally to analysis of data associated with a performance of one or more parties. In particular, the systems and methods described herein collect interaction data including task measurements associated with one or more tasks performed by one or more parties within a multi-party interaction, analyze the task measurements and contextual data to determine a task score in real-time for each task, normalize the task scores, and generate an aggregate score for the party and/or multiples parties representing a performance of the party and/or the multiple parties.

The systems and methods described herein include some examples of how the systems and methods may be implemented. These examples are not intended to limit the systems and methods in any way. Rather, these systems and methods are used to analyze numerous multi-party interactions. One multi-party interaction that is described herein for example purposes is American football (also referred to as "football"). However, it is to be understood that the multi-party interaction of football is used for illustrative purposes only and is not intended to limit the systems and methods described herein. For example, the systems and methods described herein may be used to generate aggregate scores for other multi-party interactions, such as, but not limited to, workplaces, school, competitions (e.g., chess, debate competitions, etc.), and other sports (e.g., basketball, baseball, hockey, soccer, cricket, rugby, racing, etc.). As used herein, a "team member" refers to a party of a multi-party interaction. The team member has one or more "positions" or roles that have a set of "tasks" that the team member performs for the team. The position may be part of a "position group" that includes several related positions. The team members participate in an "multi-party interaction", which may be separated into a plurality of "interactions." In one example, the multi-party interaction is a football game and the interactions are plays performed in the game. In some embodiments, the multi-party interaction is a predetermined period of time.

An analytics engine (AE) system analyzing and evaluating data in real-time associated with a performance of parties interacting within a multi-party interaction is described herein. The AE system includes at least one AE computing device, at least one real-time data source, and at least one client computing device, as described herein. The AE computing device includes one or more processors and a memory device in communication with the processor for storing instructions. In some embodiments, the AE system includes multiple computing devices communicatively coupled together to perform the features and functionality of the AE computing device, such as a data validation (DV) computing device and a data interface (DI) computing device. The AE computing device is communicatively coupled to each client computing device and each real-time data source. In some embodiments, the client computing devices are replaced with user interfaces that are communicatively coupled to the AE computing device. In other embodiments, the client computing devices include the real-time data sources. In yet other embodiments, the real-time data sources may be application program interfaces (APIs), IP addresses, databases, and/or other type real-time data source that may transmit and receive data to and from the AE computing device. As defined herein, real-time relates to the AE system processing data within a short period of time or as the user is performing the tasks with a computing device (e.g., milliseconds to seconds, or possibly minutes depending upon the task) so that the data output and/or input is available virtually immediately.

The AE computing device is configured to generate aggregate scores for one or more parties within a multi-party interaction, and display the aggregate scores to enable end-users to make decisions based on the displayed aggregate scores. In the example embodiment, the AE computing device is further configured to receive task measurements from the real-time data sources that are used to generate at least in part the aggregate scores. In other embodiments, the AE computing device is configured to generate the aggregate scores without receiving task measurements from the real-time data sources.

In the example embodiment, the AE computing device is configured to define a task score for each task of a plurality of tasks. The tasks are associated with a particular multi-party interaction that the AE computing device is configured to analyze. For example, using the football multi-party interaction, the plurality of tasks may include tasks, such as passing, rushing, receiving, blocking, and the like. Each task is associated with a set of predefined task measurements. A task measurement is a discrete, quantitative measurement of the performance of a task that the AE computing device uses to generate a task score and an aggregate score, as described herein. The task measurements facilitate capturing one or more parties' performance, including information that is not typically included in traditional statistics for a particular multi-party interaction. In the example embodiment, each of the tasks is associated with at least one task measurement of zero that is representative of 'as expected' or 'normal' performance. The tasks are further associated with negative and positive task measurements to represent poor and good performance of the task, respectively. For example, the task measurements may be assigned on a scale of −2 to +2. In other embodiments, different ranges of task measurements may be used. For each task measurement, the AE computing device is configured to include a description data field that indicates what level of performance is representative of the task measurement, as described herein. In some embodiments, the AE computing device is configured to receive at least a portion of the task measurements from one or more real-time data sources. The AE computing device is also configured to generate task scores based on the received task measurements.

The AE computing device is further configured to store the task measurements and task scores in a database communicatively coupled to the processor. The database may store task measurements and task scores in sections defined by related tasks to facilitate efficient look-ups and identification of tasks and scoring. The AE computing device provides the real-time data sources access to the stored task measurements and task scores. The AE computing device may transmit the stored task measurements and task scores to the real-time data sources and/or provide a communication interface that the real-time data sources access to view the stored task measurements and task scores. Users of the real-time data sources, such as collectors, may reference the stored task measurements to input task measurements into the real-time data sources, as described herein.

In the example embodiment, the AE computing device is configured to collect the task measurement data via interaction data transmitted by at least one real-time data source. The interaction data is associated with a multi-party interaction occurring during a multi-party identifier and includes, but is not limited to, an interaction identifier, a party identifier, a multi-party identifier, a location identifier, a position identifier, a timestamp, comment fields, normalization factors, task measurement data including at least one task measurement, at least one task measurement identifier, and a task identifier, and/or other forms of data that may be collected from the multi-party interaction. In the example embodiment, the interaction data is associated with a play occurring during a football game. The AE computing device is also configured to retrieve contextual data from a contextual data source. The contextual data includes, but is not limited to, event identifiers, event base data, party identifiers, and party base data. In some embodiments, contextual data includes any number of category identifiers.

As used herein, base data refers to additional properties (e.g., data fields) may be associated with events, parties, interactions, and/or tasks. In some embodiments, base data is associated with a task measurement (e.g., task base data), and is included in real time data received from a real time data source. In one embodiment, where the task measurement is associated with a football player, the task base data includes an offense or defense category. In other embodiments, base data is associated with an interaction (e.g., interaction base data) and is retrieved from the contextual data source using an interaction identifier. For example, interaction base data may include a play category, indicating a type of football play. (e.g., sweep, running play).

In the example embodiment, the AE computing device is configured to receive user input in the form of interaction data from the real-time data sources. For example, users accessing the real-time data sources may review a video of a football game and assign task measurements to each task performed by one party. In one example, each user has particular input tasks that the user may enter along with one party and/or multiple parties that each user is responsible to assign task measurements for at least a portion of the multi-party interaction. In the example embodiment, some users may specifically review tasks, such as pre-snap formations, passing plays, running plays, or special teams plays. The real-time data sources transmit the interaction data (e.g., user input data) to the AE computing device. Once the interaction data is received by the AE computing device, the AE computing device parses the interaction data based on the contextual data, retrieves the task measurements from the interaction data, and stores the task measurements in an analysis database. Each task measurement is associated with a party identifier corresponding to a particular party within the multi-party interaction. The task measurements may also be associated with comment fields where the users may input comments on how a particular task measurement was determined. The comment fields are configured to store the comments in a particular format to enable the AE computing device to parse the comment field and identify the comments provided by the users. In some embodiments, the comments include any number of tags. In one embodiment, the AE computing device is configured to identify tagged comments based on character strings, such as "TSFG" and "TFL." Additionally or alternatively, comment tags may be prefixed by tag symbols, such as "#TSFG" and "$TFL."

In some embodiments, the AE computing device is configured to track each task that each user is responsible to assign task measurements. The AE computing device tracks each task using the task identifier included in the interaction data. By tracking each task, the AE computing device is able to determine if one or more task measurements are missing from the interaction data. The AE computing device is able to determine which task measurements are missing by comparing the received task measurements to predefined task measurements associated with the task identifier. If the AE computing device determines that one or more task measurements are missing, the AE computing device transmits a notification message to the real-time data source that transmitted the task measurements. The notification message may include data, such as a task measurement identifier associated with the missing task measurement, a task identifier, a timestamp associated with the task, and other data that the real-time data source may require to identify the task measurement that is missing. In certain embodiments, the AE computing device is further configured to determine if the one or more task measurements are inconsistent or incorrect, such as by using a the data validation (DV) computing device to compare multiple instances of task measurements.

In at least some embodiments, when the AE computing device receives interaction data from a real-time data source, the AE computing device updates the analysis database and transmits synchronously the interaction data to other real-time data sources. For example, if one real-time data source transmits interaction data for pre-snap formations of a play in a football game, the AE computing device receives the interaction data and updates the analysis database using at least one party identifier included in the interaction data. The updated analysis database includes data fields for each party identifier to enable the AE computing to parse and/or filter data within the analysis database based on the party identifier. By parsing and filtering data based on the party identifier, the AE computing device is able to retrieve and transmit output analysis data from the analysis database. The AE computing device is configured to transmit the output analysis data to client computing devices associated with end-users and/or real-time data sources.

In the example embodiment, the AE computing device is in communication with the data validation (DV) computing device. In other embodiments, the AE computing device performs the functions of the DV computing device, as described herein. The DV computing device is configured to receive the interaction data from multiple real-time data sources, and compare the received interaction data, and more specifically, the task measurements for one task associated with one or more parties in an interaction. The DV computing device performs the comparison to verify that the task measurements are consistent between real-time data sources. In the example embodiment, a first real-time data source (e.g., real-time data source A) transmits a first task measurement for a task, and a second real-time data source (e.g., real-time data source A) transmits a second task measurement for the same task. The DV computing device is configured to compare the first and second task measurements (e.g., a comparison between the task measurements received from real-time data source A and B). If both scores match, the DV computing device determines that the task measurement for the task is verified, and stores the task measurement in the analysis database. However, if the task measurements do not match, The DV computing device is configured to identify the differences between the task measurements. The DV computing device is also configured to transmit the identified differences to a third real-time data source, such as a computing device that is authorized to reconcile task measurement conflicts. The AE computing device transmits the task measurements and the identified differences to the third real-time data source for review. In response, the third real-time data source may transmit to the DV computing device a message including one of the two task measurements as the verified task measurement or a message with a new task measurement. The AE computing device is further configured to store a comparison log in the analysis database to maintain records of each instance that the DV computing device performs a comparison and/or identifies differences in the comparison to facilitate tracking errors and improving data collection.

The AE computing device is also configured to calculate a task score for a task performed by one party once the AE computing device receives the interaction data. The AE computing device parses the interaction data and retrieves the task measurements from the interaction data associated with the task. Subsequently, the AE computing device calculates the task score by performing an average of the retrieved task measurements. The AE computing device may also calculate the task score by aggregating the retrieved task measurements. For example, the AE computing device may calculate a task score for a running back by using task measurements, such as a rushing measurement, a blocking measurement, and a receiving measurement. The AE computing device stores the task scores within the analysis database.

The AE computing device is further configured to normalize the task scores received during a multi-party interaction to provide accurate metrics for evaluating performance of a party in comparison to other parties interacting in the multi-party interaction. To normalize the task scores for a party, the AE computing device is configured to determine whether a task and corresponding task measurements are associated with normalization factors. The normalization factors are data elements that indicate multi-party interaction conditions in which the task was performed. In the example embodiment, the normalization factors are included in the interaction data and are retrieved, by the AE computing device, from the interaction data. In other embodiments, the normalization factors are directly input by a user into the AE computing device. The AE computing device is configured to store the normalization factors in a normalization database in communication with the AE computing device. In one example, for a pass rusher, the normalization factors may include down and distance, stance, position relative to the other team's players, quarterback drop (e.g., three-step, seven-step, etc.), and so forth.

The AE computing device is configured to build normalization rules and generate normalization model data based on the normalization rules. The AE computing device uses stored normalization factors to build the normalization rules. The stored normalization factors may be received from past task measurement and base data received (e.g., historical data over previous games and/or previous years of games) and/or input directly into the AE computing device. The AE computing device is also configured to generate the normalization model data based on the normalization rules and update the normalization model data once the normalization factors are received. The normalization model data includes predefined values indicating an average task score for a task and the normalization rules associated with each task. In the example embodiment, the AE computing device stores the normalization rules and the normalization model data in the normalization database. By using the normalization model data, the AE computing device may determine if a task score requires normalization. In one embodiment, the normalization rules map category identifiers to normalization factors. For example, a normalization rule may include determining a normalization factor is associated with interaction data based on a specific category identifier included in the interaction data and/or associated contextual data. Additionally or alternatively, the normalization rule may be compared to task measurement data.

In one example, the AE computing device may determine that a task score requires to be normalized to zero. A task score may be normalized to zero if the party associated with the task score had a limited chance of having a positive or negative performance of the task. The AE computing device determines whether the party had a limited chance of having a positive or negative performance of the task by comparing the number of task scores received from that party to the average number of task scores received from other parties performing the same task during the multi-party interaction. In another example, the model normalization data for a pass rusher on a seven-step drop is typically greater than the model normalization data for a three-step drop (e.g., this is because typically a greater chance of a positive performance on a seven-step drop play versus a three-step drop play for a defensive pass-rusher). Therefore, the pass rusher's task score when the quarterback takes a seven-step drop is negatively affected by normalization more than the pass rusher's score for a three-step drop. Accordingly, the AE computing device applies the normalization model data to task score with the same or similar task conditions as the conditions in which prior similar task were performed, thereby removing the task condition advantage from the task score.

The AE computing device is also configured to store a list of normalization exceptions. In the example embodiment, the AE computing device receives the list of normalization exceptions from the real-time data sources. The AE computing device is further configured to compare the normalization rules to the list to determine if a normalization exception has occurred. In another embodiment, the AE computing device receives a flag from one or more real-time data sources indicating that a normalization exception has occurred. If the AE computing device determines that a normalization exception has occurred, the AE computing device does not normalize the task score.

The AE computing device may further normalizes the task scores by using a replacement factor. The replacement factor is a task score of a party relative to an average task score of replacement parties that may interact in the same position (i.e., categorization) as the party within a multi-party (e.g., a team). The average task score of replacement parties are defined by averaging the task scores of parties that are freely available to join the team. In the example embodiment, the average task score of replacement parties is normalized to zero. Accordingly, the replacement factor is the difference between the task score of the party and the average task score of replacement parties.

The AE computing device is configured to normalize a party's task score by, at least partially, using the normalization model data and the replacement factors. In one embodiment, the AE computing device generates a task score modifier as a function of the normalization model data and the replacement factors. In particular, the task score modifier is the sum of the normalization model data and the replacement factors multiplied by a number of tasks of a party during a multi-party interaction. The AE computing device is configured to generate the party's normalized task score by subtracting the task score modifier from the party's task score. The AE computing device repeats the normalization for each party's task score that the AE computing device determines that a normalization exception does not apply.

Once the AE computing device has normalized the party's task score, the AE computing device calculate an aggregate score for the party in a multi-party interaction. In some embodiments, the AE computing device generates the aggregate score by adding the party's normalized task scores received during a multi-party interaction (e.g., a game). In other embodiments, the AE computing device averages the party's normalized task scores over the total number of tasks performed by the party during the multi-party interaction. Similar to the task measurements, each party may be associated with one or more aggregate scores.

The AE computing device is configured to use the party's normalized task score to calculate the aggregate score because using non-normalized task scores to calculate the aggregate score may not accurately reflect a party's performance in comparison to other parties within the multi-party interaction. For example, one party may have had more opportunities to participate than other parties or may have had better situations to receive positive task scores than other parties. In one example, a pass rusher that participates on a relatively large number of passing plays with seven-step drops is likely to have a better task measurement than a pass rusher that participates on a lower number of similar passing plays.

In certain embodiments, the AE computing device is configured to change the format or scale of the aggregate scores (e.g., 0-100 scale) for display. In one example, the aggregate scores may be compared to predefined threshold values and assigned a letter grade or other indicator based on the comparison. In embodiments in which the parties are associated with a plurality of aggregate scores, the AE computing device is configured to apply weighting factors to each normalized task score when calculating an aggregate score associated with the party. For example, for an offensive tackle position, pass blocking has the highest weighting factor, run blocking has the next highest, and penalties have the lowest weighting factor.

In at least some embodiments, the AE computing device uses the aggregate score to generate a scaled aggregate score for a plurality of multi-party interactions. For example, the aggregate score for a football game may be used to generate a scaled aggregate score for a football season that includes the game. In some embodiments, the aggregate score may be adjusted to account for different scoring processes over time.

Once the AE computing device calculates the aggregate scores, the AE computing device may transmit the aggregate scores to client computing devices, real-time data sources, and/or other computing devices to be displayed. In some embodiments, the aggregate scores are stored within a database, such as the analysis database. The analysis database is separated into data tables, such as an event table, a party table, and interaction table, and a task table. In the example embodiment, the event table is configured to store data associated with a multi-party interaction (e.g., an event), such as an event identifier and event base data. The party table is configured to store data associated with a party of the multi-party interaction, such as a party identifier and party base data. The interaction table is configured to store data associated with interactions, such as an interaction identifier, interaction base data, and interaction index value. The task table is configured to store data associated with a task such as task measurements, a task identifier, and task scores. The analysis database is separated into data tables to facilitate storing event data and task scores in a defined, searchable format. The analysis database is configured to be searchable and navigable to facilitate efficient location of particular data within the analysis database.

In at least some embodiments, the AE computing device is configured to identify trends or other analytics using data stored in the analysis database and normalization database. The AE computing device may transmit the identified trends to real-time data sources for review. In certain embodiments, the analysis database and the normalization database are in communication to enable the AE computing device to retrieve, calculate, transmit, and store data in real-time.

In some embodiments, the AE computing device receives a video including video data and metadata from the client computing devices. The metadata identifies a multi-party interaction associated with the video data (i.e., a game associated with the video data). In at least some embodiments, the metadata also includes markers that identify timestamps within the video data for separate interaction of the multi-party interaction and other discrete portions or highlights of the multi-party-interaction. In certain embodiments, the metadata may include predetermined statistics, party identifiers, position identifiers, metrics, and the like for the AE computing device to use.

The AE computing device is also configured to scan the video (e.g., using image recognition techniques) to identify at least a portion of the video data and metadata, compare and match the video data and metadata to data stored in the analysis database, and retrieve at least a portion of the video data and metadata from the video data. In one example, the AE computing device may generate or modify particular data fields within the analysis database based on the metadata and/or the video data. For example, the AE computing device may scan the video and/or parse the video data and metadata to automatically determine a type of play, field position, turnovers on downs, down and distance, and player roles and stances for a football game. In another example, the AE computing device may add and/or remove data from the video. That is, the AE computing device may add one or more task scores to the video and transmit the video to a client computing device with instructions for the client computing device to display the one or more task score in the video. In the example embodiment, the AE computing device is in communication with the data interface (DI) computing device which is configured to generate an interface between the AE computing device and one or more client computing devices. The DI computing device may be configured to transmit and receive the video to and from one or more client computing devices. In other embodiments, the AE computing device performs the functions of the DI computing device.

In the example embodiment, the AE computing device is configured to provide each client computing device with access to at least a portion of the video data and data stored in the analysis database and normalization database. In some embodiments, the AE computing device is configured to store a table of user permissions including end-user identifiers. In one example, when a client computing device accesses the AE computing device, the AE computing device is configured to identify the client computing device using an end-user identifier received from the client computing device. The AE computing device compares the end-user identifier to the end-user identifiers stored in the table of permissions, and determines which portions of the video may be displayed by the client computing device.

The methods and systems described herein may be implemented using computer programming or engineering techniques including computer software, firmware, hardware or any combination or subset thereof, wherein the technical effects may be achieved by performing one of the following steps: (i) receiving validated interaction data from a data validation (DV) computing device, wherein the validated interaction data includes at least a real-time data source identifier, a party identifier, task measurement data, and at least one category identifier; (b) retrieving contextual data from a contextual data source based on the party identifier in the validated interaction data, wherein the contextual data includes at least an interaction identifier; (c) determining a task identifier, based at least in part on the party identifier, the interaction identifier, and the at least one category identifier; (d) calculating a task score using the contextual data and the task measurement data, wherein the task score is associated with the task identifier; (e) retrieving normalization model data from a normalization database based at least in part on the at least one category identifier, wherein the normalization model data includes a plurality of normalization rules and a plurality of normalization factors; (f) comparing the plurality of normalization rules to the validated interaction data and the contextual data; (g) determining based on the comparison, at least one normalization factor of the plurality of normalization factors applies to the task score; (h) normalizing the task score based on the at least one normalization factor; (i) calculating an aggregate score using the normalized task score; and (j) storing the validated interaction data, the normalized task score, and the aggregate score in an analysis database based on the task identifier, wherein the analysis database is partitioned based at least in part on a party identifier and a task identifier.

The systems and methods described herein are configured to facilitate (a) improved performance analysis of interactions of a parties and multi-parties; (b) improved measurements of data; (c) synchronized analysis for multiple client computing devices; (d) improved verification of user input that includes task measurements; (e) improved analysis and evaluation speed of task measurement by implementing a specific system architecture; and (f) reduced analysis time by automating or partially automating a performance analysis process.

Described herein are computer systems such as a performance analytics computing device and a client computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In certain embodiments, the system is run on a Linux® server environment (Linux is the registered trademark of Linus Torvalds in the U.S. and other countries). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

FIG. 1 is a block diagram of an example analytics engine (AE) system 100 for analyzing and evaluating data in real-time associated with a performance of parties interacting within a multi-party interaction. AE system 100 includes any number of real-time data sources (e.g., real-time data sources 142, 144, and 146) and data validation (DV) computing device 140. As used herein, real-time data sources include WebSocket connections, HTTP connections, and the like, and is configured to transmit interaction data, including task measurements, to DV computing device 140 such that interaction data is transmitted in real-time. In some embodiments, a real-time data source includes a collector generating task measurements based on observations of a real-time multi-party interaction (e.g., a game). For example, real-time data source 142 may include a WebSocket connection transmitting interaction data to DV computing device 140 as the collector generates task measurements for each task (e.g., play) performed by a party (e.g., player). Additionally or alternatively, real-time data source 142 includes an image processing computing device generating measurements. For example, real-time data source 144 may include a HTTP-based API connection transmitting interaction data to the DV computing device 140 as the image processing computing device generates task measurements. In certain embodiments, real-time data sources 142, 144, and 146 may be associated with a source identifier, such as an IP address, username, or serial number. In one embodiment, source identifiers further include a trust level indicator, identifying a relative level of trust (e.g., accuracy, precision, and reliability) associated with a real-time data source. For example, a source identifier may indicate trust level 1 or trust level A.

DV computing device 140 is configured to receive interaction data from real-time data sources, and transmit validated interaction data to analytics engine (AE) computing device 110. In some embodiments, DV computing device 140 may be a component of AE computing device 110.

Analytics engine (AE) computing device 110 is communicatively coupled to DV computing device 140 and contextual data source 150. In some embodiments, AE computing device 110 is connected to DV computing device 140 using a socket connection (e.g., Web Socket connection). AE computing device 110 is configured to receive validated interaction data from DV computing device 140, and to retrieve contextual data from contextual data source 150. In some embodiments, AE computing device 110 includes a message queue, storing validated interaction data as it is received from the DV computing device 140. In the example embodiment, AE computing device 110 is communicatively coupled to normalization database 121 and analysis database 122. Normalization database 121 stores normalization rules and normalization factors. Analysis database 122 stores interaction data. In one embodiment, analysis database 122 includes an event table, interaction table, party table, and task table. AE computing device 110 is configured to query (e.g., SQL queries, API calls) databases, including normalization database 121 and analysis database 122. AE computing device 110 is further configured to receive query responses.

Data interface (DI) computing device 120 is connected to, at least one of, normalization database 121, analysis database 122, and AE computing device 110. In one embodiment, DI computing device 120 is configured to provide an HTTP based API (i.e., Web API) to a client device, such as client computing device 132. For example, DI computing device 120 may receive an API request including a party identifier from client computing device 132, and DI computing device 120 may transmit an API response including associated output analysis data as an XML file. In another embodiment, DI computing device 120 includes a web server processing view requests. For example, DI computing device 120 may receive a view request from client computing device 132 (e.g., an end-user, such as the National Football League (NFL)), and may transmit a HTML response over HTTP, including instructions to render a webpage including analysis information.

In other embodiments, AE system 100 may include additional, fewer, or alternative devices, including those described herein.

Figure 2:
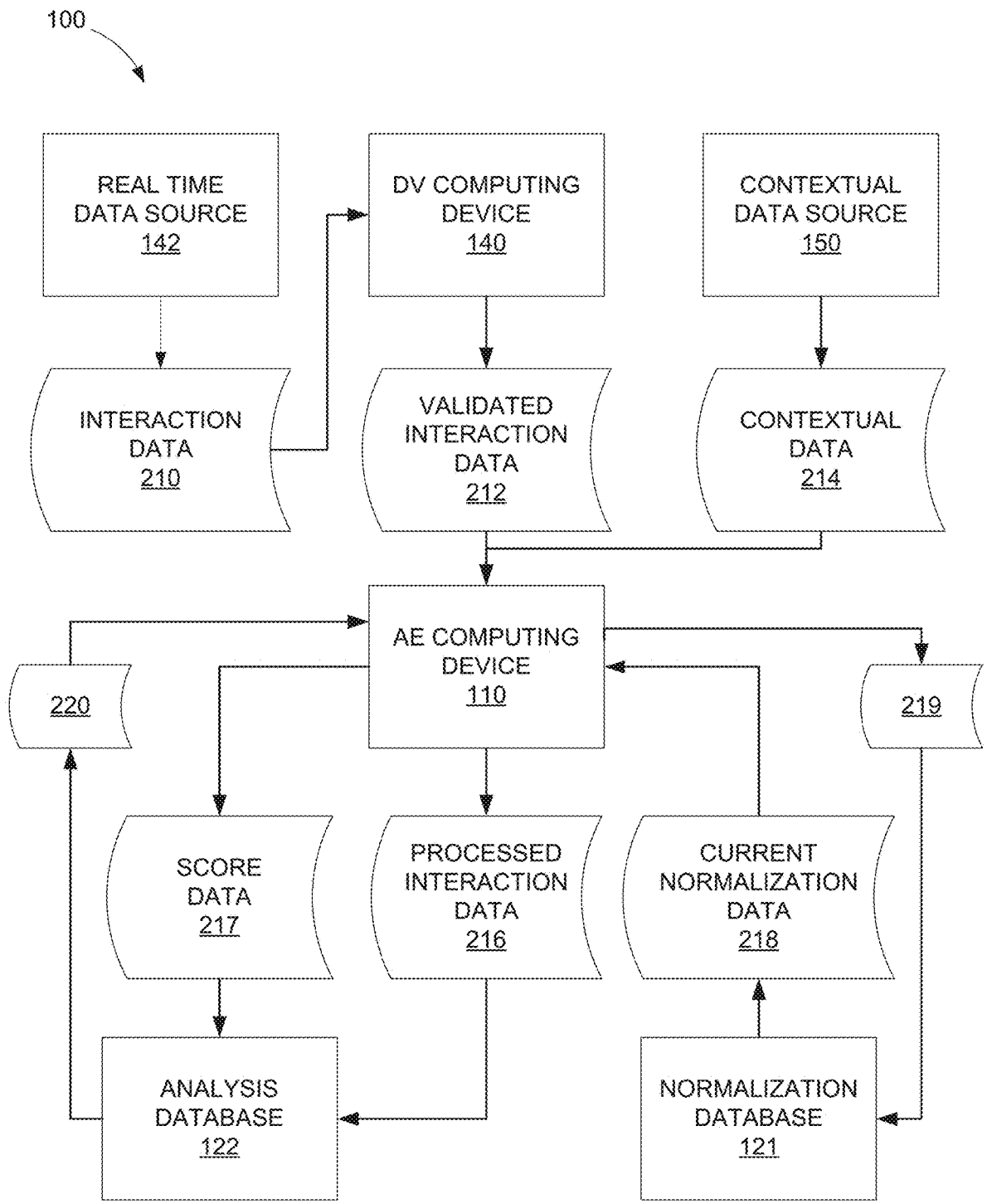
FIG. 2 is a data flow diagram of an example data analysis and evaluation process used by the AE system shown in FIG. 1 in accordance with an embodiment of the present disclosure.

FIG. 2 is a data flow diagram of AE system 100 (shown in FIG. 1). Real-time data source 142 is configured to transmit interaction data 210, including task measurement data, to DV computing device 140. Interaction data 210 includes a number of instances of task measurement data. In some embodiments, interaction data 210 further includes a real-time data source identifier, such as an IP address, user name, or device type identifier. In one embodiment, task measurement data includes a data score, a time identifier (e.g., timestamp, relative time indicator), and a measurement specification (e.g., measurement category identifier, measurement unit). For example, task measurement data may include a score of +1, a time remaining on a game clock (e.g., 05:14), and a category identifier associated with, for example, an analysis of a football team's defense. Additionally or alternatively, task measurement data may include a measurement data point and a unit. For example, task measurement data may include a measurement of 450 yards, and a time indicating that 5 minutes and 4 seconds remaining in the game. In certain embodiments, task measurement data further includes a real-time data source identifier, such as a username and/or IP address associated with the real-time data source. In some embodiments, task measurement data includes category identifiers. Additionally or alternatively, AE computing device 110 is configured to determine category identifiers associated with task measurement data, based on contextual data 214.

DV computing device 140 is configured to receive interaction data 210, process interaction data 210 into validated interaction data 212, and transmit validated interaction data 212 to AE computing device 110. DV computing device 140 is configured to correlate task measurement data based on the data score and/or measurement specification (e.g., category identifier, measurement unit). In some embodiments, DV computing device 140 is further configured to correlate measurement data based on real-time data source identifiers.

In some embodiments, DV computing device is configured to generate validated interaction data 212 based on measurement correlation. Measurement correlation includes determining the accuracy and/or precision of data based on comparing multiple instances of task measurement data included in interaction data 210. In one embodiment, DV computing device 140 is configured to generate validated interaction data 212 based on receiving at least two substantially similar instances of task measurement data (e.g., including similar measurement identifiers, measurements, and timestamps) with differing source identifiers. For example, DV computing device 140 may generate validated measurement data based on two similar measurements provided from different real-time data sources, such as different collectors (e.g., received task measurements from collectors A and B and compare the measurements to identify inconsistencies). In certain embodiments, DV computing device 140 is be configured to detect measurement data faults. In one embodiment, DV computing device 140 is configured to identify at least two instances of measurement data including similar measurement identifiers and timestamps with differing measurements, and to generate an error notification, such as a debugging log entry, including the at least two instances of measurement data.

Additionally or alternatively, DV computing device 140 is configured to generate validated interaction data 212 based on a real-time data source identifier. In some embodiments, DV computing device 140 is configured to identify at least two instances of task measurement data including similar measurement identifiers and timestamps with differing measurements and real-time data source identifiers. DV computing device 140 is further configured to determine a trust level associated with each task measurement data instance, based at least in part on the real-time data source identifier. In one embodiment, the DV computing device determines a trust level associated with each real-time data source identifier based on previous error notifications and/or a debugging log. For example, the DV computing device may determine, based on the debugging log, a first real-time data source identifier is more accurate compared to a second real-time data source identifier, and may further generate validated measurement data based on the measurement data instances associated with the first real-time data source identifier. In another embodiment, the real-time data source identifier may include a trust level. For example, the real-time data source identifier may include a calibration level, or accuracy rating, and/or trust category, such as a real-time data source identifier indicating a real-time data source is associated with a high accuracy.

AE computing device 110 is also configured to receive validated interaction data 212, retrieve contextual data 214, store processed interaction data 216, retrieve current normalization data 218, retrieve stored interaction data 220, generate updated normalization data 219, and generate score data 217.

AE computing device 110 is configured to retrieve contextual data 214 from contextual data source 150, based on validated interaction data 212. Contextual data 214 includes event identifiers, event base data, party identifiers, and party base data. For example, contextual data 214 may include team rosters, player names, teams/franchises, or the like. In some embodiments, contextual data 214 includes a player height, weight, and the like. Additionally or alternatively, contextual data 214 includes combined metrics such as speed metrics (e.g., 40 yard dash time), and performance metrics (e.g., yards per play, conversions, points per trip).

AE computing device 110 is configured to store processed interaction data 216 in analysis database 122, based on validated interaction data 212. AE computing device 110 is configured to process validated interaction data 212 into processed interaction data 216 for storage in analysis database 122. In one embodiment, AE computing device 110 generates database records and/or SQL queries based on validated interaction data 212. In some embodiments, AE computing device 110 is configured to determine at least one event identifier, and at least one party identifier associated with task measurement data included in validated interaction data 212. In one embodiment, AE computing device determines an event identifier and a plurality of party identifiers associated with validated interaction data 212 based on the event base data and/or party base data included in contextual data 214. In certain embodiments, AE computing device 110 is configured to generate database instructions (e.g., SQL queries, API calls) to store validated interaction data 212 in analysis database 122. In one embodiment, AE computing device 110 is configured to parse validated interaction data 212, determine identifiers from validated interaction data 212 based on contextual data 214, and generate database instructions to store validated interaction data 212 and the determined identifiers in analysis database 122. In some embodiments, processed interaction data 216 includes instructions to store validated interaction data 212 as a data record in analysis database 122 having an interaction identifier, such that the stored data is accessible using any combination of the party identifier, event identifier, and/or interaction identifier. In some aspects, stored processed interaction data 216 is a parsed and/or indexed version of validated interaction data 212, including at least the task measurement data.

AE computing device 110 is configured to retrieve current normalization data 218 from normalization database 121 based on validated interaction data 212 and contextual data 214. Current normalization data 218 includes normalization factors and/or normalization rules associated with validated interaction data 212. In some embodiments, AE computing device 110 is configured to retrieve current normalization data 218, such as applicable normalization rules, based on the received contextual data 214 associated with validated interaction data 212. For example, AE computing device 110 may retrieve current normalization data 218 based on any combination of interaction identifier, player identifier, and/or event identifier. Additionally or alternatively, AE computing device 110 is configured to retrieve current normalization data 218 based on task measurement data included in validated interaction data 212. For example, AE computing device 110 may retrieve normalization model data (i.e., current normalization data 218) associated with a category of measurements. In one embodiment, the normalization factors include data elements that indicate multi-party interaction conditions in which the task was performed, and the normalization rules include instructions configured to modify (e.g., normalize) task scores based on the normalization factors and the analysis data.

AE computing device 110 is also configured to retrieve stored interaction data 220 from analysis database 122, based on current normalization data 218. In some embodiments, AE computing device 110 is configured to retrieve stored interaction data 220 based on normalization factors and/or normalization rules included in current normalization data 218. In one embodiment, where current normalization data 218 includes a normalization rule, the normalization rule may instruct AE computing device 110 to retrieve stored interaction data 220 associated with validated interaction data 212, such as comparable and/or relevant interaction data. For example, relevant interaction data may be used by the normalization rules to generate an average. Additionally or alternatively, AE computing device 110 may be configured to retrieve stored interaction data 220 based on validated interaction data 212 and contextual data 214. In some embodiments, AE computing device 110 retrieves stored interaction data 220 by querying analysis database 122 using contextual data 214 with any combination of party identifiers, event identifiers, and/or interaction identifiers.

AE computing device 110 is configured to generate updated normalization data 219 based on validated interaction data 212, contextual data 214, and current normalization data 218. AE computing device 110 is configured to generate and/or update normalization data, such as normalization rules and normalization model data. In some embodiments, the AE computing device 110 generates updated normalization rules by applying the normalization model data to validated interaction data 212. For example, AE computing device 110 may generate updated normalization data 219 and store updated normalization data 219 in normalization database 121.

AE computing device 110 is configured to generate score data 217, including normalized task scores, and aggregated scores, based on validated interaction data 212, contextual data 214, stored interaction data 220, and current normalization data 218. AE computing device 110 is configured to parse task scores from validated interaction data 212. In some embodiments, AE computing device 110 is configured to generate normalized task scores by applying normalization rules to task scores. In one embodiment, AE computing device 110 generates a task score modifier as a function of the normalization model data and the replacement factors. In some embodiments, where real-time data includes normalization exception information, AE computing device 110 is configured to disable normalization for a specific task score. In some embodiments, AE computing device 110 generates normalized task scores based on replacement factors. That is, AE computing device 110 generates the normalized task scores based on the task score of a party relative to an average task score of replacement parties that may have a similar categorization as the party. In some embodiments, AE computing device 110 generates an aggregate score by adding the party's normalized task scores received during a multi-party interaction (e.g., a game). In other embodiments, the AE computing device 110 averages the party's normalized task scores over the total number of tasks performed by the party during the multi-party interaction, such that each party may be associated with one aggregate score per multi-party interaction. AE computing device 110 is further configured to store score data 217 in analysis database 122.

Figure 3:
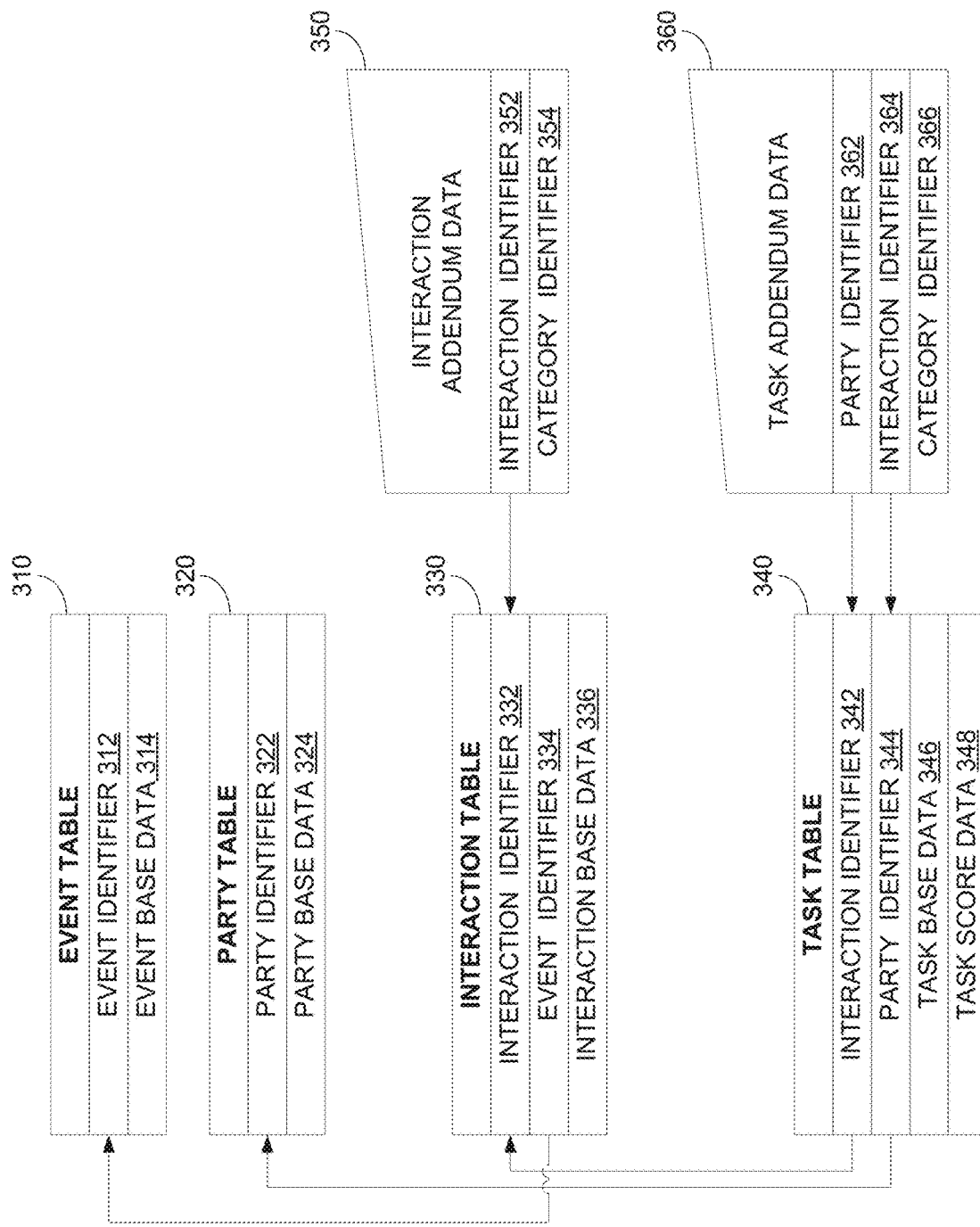
FIG. 3 is an example configuration of an analysis database used by the AE system shown in FIG. 1 in accordance with an embodiment of the present disclosure.

FIG. 3 depicts an example configuration of analysis database 122, included in AE system 100 (shown in FIG. 1). Analysis database 122 includes, at least, event table 310, party table 320, interaction table 330, and task table 340. Event records in event table 310 are uniquely identified by an event identifier 312. Party records in party table 320 are uniquely identified by a party identifier 322. Interaction records in interaction table 330 are uniquely identified by an interaction identifier 332. In some embodiments, identifiers are generated by analysis database 122. Additionally or alternatively, identifiers may be generated by AE computing device 110 (shown in FIG. 1) based on contextual data 214 (shown in FIG. 2). In the example embodiment, task records in task table 340 are uniquely identified by a combination of an interaction identifier 342 and a party identifier 344. In an alternate embodiment, task records include a unique task identifier. Interaction records in interaction table 330 are associated with an event record in event table 310, using an event identifier 334, such that an event is associated with a set of interactions. Task records in task table 340 include an interaction identifier 342, such that an interaction is associated with a set of tasks. Task records further include party identifier 344, such that task records are associated with at least one party.

AE computing device 110 is configured to generate interaction records in interaction table 330 based on validated interaction data 212 (shown in FIG. 2) and associated contextual data 214. Additionally or alternatively, AE computing device 110 is configured to determine an interaction identifier 332 associated with validated interaction data 212 and/or associated contextual data 214. In some embodiments, AE computing device 110 is configured to store at least part of contextual data 214 as interaction base data 336.

AE computing device is also configured to generate task records in task table 340, based on task measurement data included in validated interaction data 212. Additionally or alternatively, AE computing device 110 is configured to determine a task identifier and/or a party identifier 344 associated with validated interaction data 212 and/or associated contextual data 214. In some embodiments, AE computing device 110 is configured to store instances of task measurement data, included in validated interaction data 212 (shown in FIG. 2), as records in task table 340. In one embodiment, AE computing device 110 stores an instance of task measurement data in task base data 346, and determines an associated interaction identifier 342 and party identifier 344 based on the associated validated interaction data 212 and contextual data 214. In some embodiments, task base data 346 includes multiple instances of task measurement data.

AE computing device 110 is configured to generate and/or create party data records in event table 310, based on validated interaction data 212 and/or associated contextual data 214. In some embodiments, where the AE computing device determines, based on contextual data 214, that validated interaction data 212 is associated with at least one party, the AE computing device is configured to perform at least one of retrieving a party identifier 322, or generating a party record including party identifier 322. For example, validated interaction data 212 may include a task measurement associated with a newly identified party, and AE computing device 110 may generate a party record including party identifier 322 and party base data 324, based on contextual data 214. Additionally or alternatively, party identifier 322 may be generated by analysis database 122. In one embodiment, AE computing device 110 is configured to generate a party identifier 322 and party base data 324 based on the first time a party identifier is identified in validated interaction data 212. AE computing device 110 is further configured to retrieve party identifiers based on subsequence identification of the party identifier in validated interaction data 212. In certain embodiments, AE computing device 110 maintains a party table 320 including unique records for each party that the AE computing device has analyzed across interactions and/or events.

AE computing device 110 is configured to generate and/or create event data records based on contextual data 214. In some embodiments, where the AE computing device determines contextual data 214 is associated with an event, the AE computing device is configured perform at least one of, retrieving an event identifier 312 from event table 310, or generating an event record, including an event identifier 312. For example, contextual data 214 may include an event specification, and AE computing device 110 may be configured to generate an event record, including an event identifier 312 and event base data 314, based on contextual data 214. As another example, AE computing device may be configured to retrieve an event identifier 312 based on an event specification included in contextual data 214. In certain embodiments, AE computing device maintains an event table 310 including unique records for each set of interactions (e.g., event) analyzed.

In the example embodiment, AE computing device 110 is configured to store task score data in analysis database 122. In some embodiments, where the AE computing device 110 generates a score (e.g., task score, normalized score) associated with a task, the AE computing device 110 is configured to transmit score data 217 to analysis database 122. Score data 217 includes, at least one score (e.g., task score, normalized score, scaled score, and the like) and an interaction identifier, such as interaction identifier 342. Additionally or alternatively, score data 217 includes a party identifier 344. Analysis database 122 is configured to store at least part of score data 217 as task score data 348 in task table 340 using interaction identifier 342 and/or party identifier 344.

Analysis database 122 is configured to receive queries, and generate query responses. In some embodiments, queries include any combination of event identifiers, party identifiers, and interaction identifiers. Additionally or alternatively, queries may include ranges and/or rules for selecting identifiers. Analysis database 122 is configured to filter base data (e.g., event base data 314, party base data 324, interaction base data 336, and task base data 346) based on the query, and generate a query response including the filtered data. For example, analysis database 122 may generate a query response including task base data 346 associated with a party identifier 344 included in the query.

In some embodiments, where task measurements include category identifiers, AE computing device 110 is configured to store task measurement data in interaction addendum data file 350. In one embodiment, AE computing device 110 is configured to determine a category identifier 354 associated with task measurement data included in validated interaction data 212. For example, a task measurement may include a category identifier (e.g., category identifier 354 and/or category identifier 366). In one embodiment, the AE computing device is configured to generate interaction addendum data file 350 in response to receiving task measurement data including a category identifier, such as category identifier 354.

In certain embodiments, AE computing device 110 is configured to generate task addendum data file 360 based on task measurement data, and a determined category identifier (e.g., category identifier 366), where the category identifier identifies a category of tasks. In an alternate embodiment, AE computing device 110 is configured to generate interaction addendum data file 350 based on task measurement data, and a determined category identifier (e.g., category identifier 354), where the category identifier identifies a category of interactions. In certain embodiments, AE computing device 110 is configured to generate both interaction addendum data file 350 and task addendum data file 360. In at least some embodiments, AE computing device 110 is configured to determine if a category identifier is associated with a category of tasks and/or interactions.

In one aspect, AE computing device 110 is configured to accommodate storing category-specific task measurements using addendum data, such that differing categories of tasks may have a partially consistent data structure. For example, all categories of tasks may have a task record, and an associated addendum data file based on a category identifier. In some embodiments, AE computing device 110 is configured to store any number of instances of task measurement data as task addendum data file 360. Specifically, AE computing device 110 may generate a task addendum data file 360, including the party identifier 362 and the interaction identifier 364 of the associated task record, such that task addendum data file 360 is associated with a task record included in task table 340. Task addendum data file 360 further includes the determined category identifier 366, and any number of instances of task measurement data as task addendum data. In certain embodiments, category specific task measurements are stored in task addendum data file 360, such as measurements associated with a specific type of interaction.

In alternative embodiments, AE computing device 110 is configured to store any number of instances of task measurement data in interaction addendum data file 350. Specifically, AE computing device 110 may generate an interaction addendum data file 350 including the interaction identifier, such as interaction identifier 352, of the associated interaction record, such that the interaction addendum data file 350 is associated with an interaction record from interaction table 330. Interaction addendum data file 350 further includes the determined category identifier 354, and any number of instances of task measurement data. In certain embodiments, category specific task measurements are stored in interaction addendum data file 350, such as measurements associated with a specific type of task.

In certain embodiments, AE computing device 110 is configured to store video data and/or video metadata as interaction addendum data. In one embodiment, validated interaction data 212 includes video data and video metadata associated with an interaction. For example, AE computing device may determine a task identifier associated with a task measurement, and may further store the video data as task addendum data including the task identifier. Video data includes visual media in a machine readable format, such as MPEG4, WEBM, and the like. Video metadata includes, in one embodiment, a marker including video timestamp indicating a location within the associated video, and an interaction identifier associated with the marker.

Figure 4:
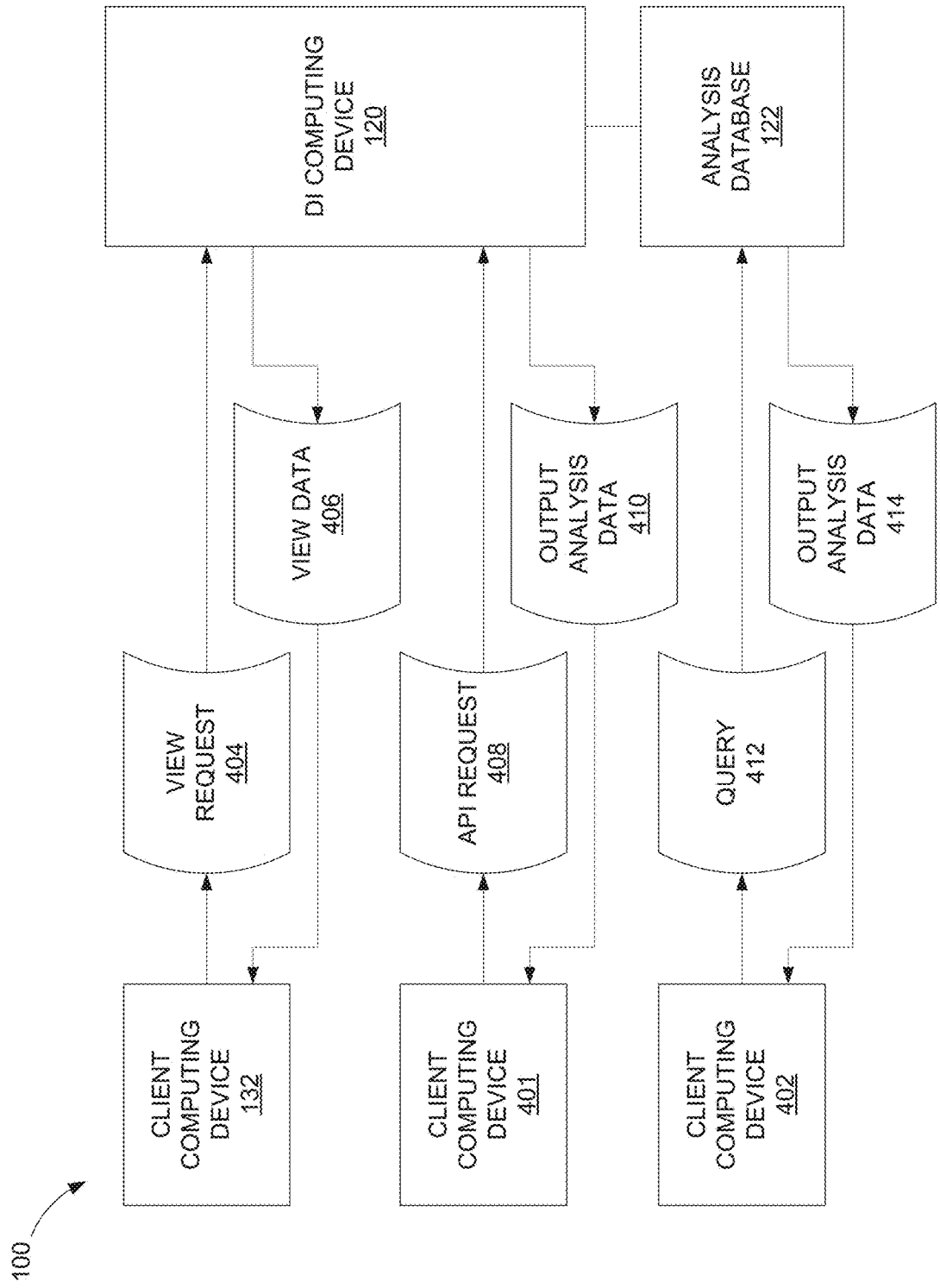
FIG. 4 is a data flow diagram of an alternative example data analysis and evaluation process used by the AE system shown in FIG. 1 in accordance with an embodiment of the present disclosure.

FIG. 4 is a data flow diagram of AE system 100 (shown in FIG. 1). AE system 100 includes any number of client computing devices, such as client computing devices 132, 401, and 402). In one embodiment, client computing devices 132 and 401 is communicatively coupled to DI computing device 120. In an alternative embodiment, client computing device 402 is communicatively coupled to analysis database 122. In at least some embodiments, client computing devices 132, 401, and 402 may be communicatively coupled to both analysis database 122 and DI computing device 120. DI computing device 120 is configured to respond to a request (e.g., view request, API requests, queries) received from client computing devices 132, 401, and/or 402. DI computing device 120 is further configured to generate and transmit a response (e.g., view data, output analysis data, API responses) to client computing devices 132, 401, and/or 402. In some embodiments, DI computing device 120 may be a component of AE computing device 110.

In certain embodiments, output analysis data includes any combination of task records, interaction records, interaction addendum data, task addendum data, party records, and event records. Output analysis data may include full records, or parts of records. In one embodiment, output analysis data includes task identifiers and normalized task scores. In certain embodiments, output analysis data further includes video metadata associated with video data, such that the output analysis data may be correlated with a field location within the video data. In one embodiment, output analysis data includes an interaction identifier and video metadata indicating a portion of the video data associated with the interaction identified by the interaction identifier.

In some embodiments, DI computing device 120 is configured to provide a website to client computing devices 132, 401, and 402. In certain embodiments, DI computing device 120 is configured to receive a view request 404 from client computing device 132. View request 404 includes any combination of event identifiers, task identifiers, party identifiers, and interaction identifiers, such that analysis data associated with the identifiers may be retrieved. Additionally or alternatively, view request 404 may include a request for recently generated content, recently updated content, an index of available analysis data, and the like. In certain embodiments, DI computing device 120 is configured to generate view data 406 based on view request 404. In one embodiment, DI computing device 120 retrieves output analysis data from analysis database 122, and generates view data (e.g., HTML, CSS, JavaScript) based at least in part on the output analysis data.

In some embodiments, DI computing device 120 queries analysis database 122 based at least in part on view request 404, to retrieve output analysis data. In certain embodiments, DI computing device 120 stores view templates (e.g., HTML templates, JavaScript templates) used to format output analysis data as a webpage. For example, DI computing device 120 may generate a webpage based on output analysis data, and transmit the webpage to client computing device 132.

In some embodiments, DI computing device 120 is configured to provide an API to client computing devices 132, 401, and/or 402. In certain embodiments, DI computing device 120 is configured to receive an API request 408 from client computing device 401, and to retrieve output analysis data 410 from analysis database 122 based at least in part on API request 408. For example, DI computing device 120 may query analysis database 122 based on an identifier included in API request 408. DI computing device 120 is configured to transmit output analysis data 410 as an API response to client computing device 401. In certain embodiments, output analysis data 410 may include a HTTP transmission, further including any of a XML file, JSON file, HTML file, and the like.

In some embodiments, analysis database 122 is configured to receive queries, such as queries 412, from client computing device 402. In one embodiment, query 412 includes any combination of task identifiers, party identifiers, interaction identifiers, and event identifiers. In certain embodiments, analysis database 122 is configured to retrieve output analysis data 414 based on query 412, and transmit output analysis data 414 to client computing device 402.

Figure 5:
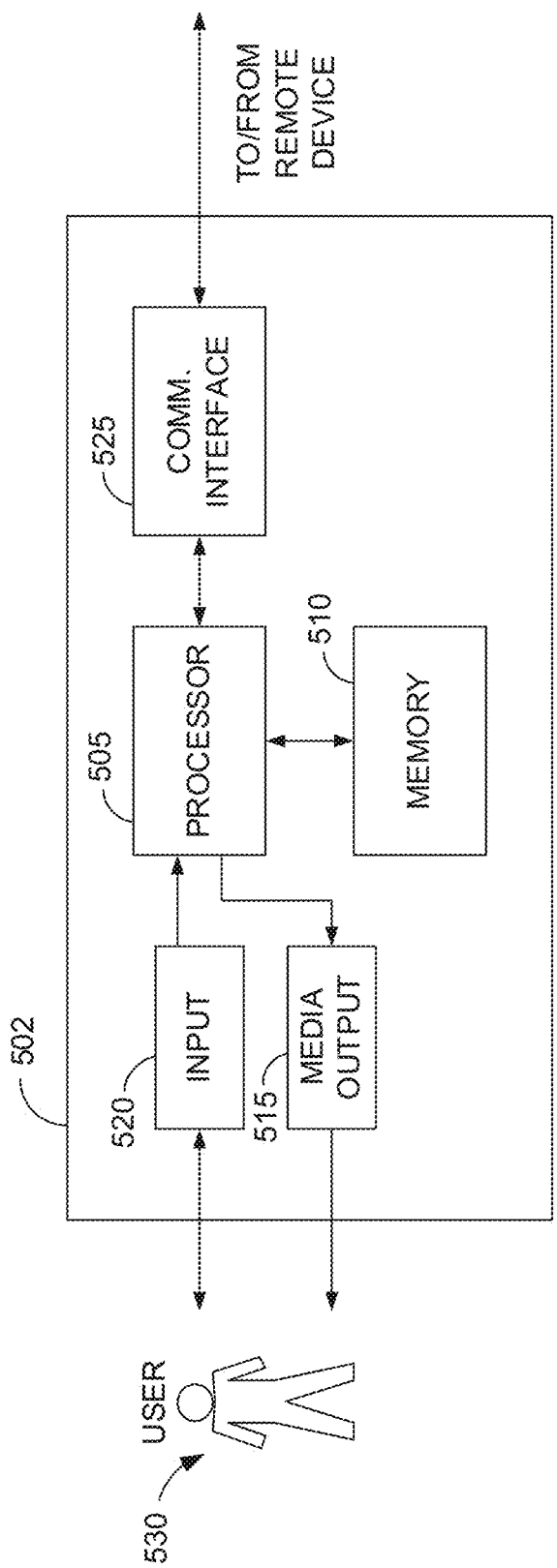
FIG. 5 illustrates an example configuration of user system, such as a client computing device shown in FIG. 1, in accordance with an embodiment of the present disclosure

FIG. 5 depicts an exemplary configuration of a remote or computing device 502, such as client computing device 132 (shown in FIG. 1). Computing device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 530 (e.g., an end-user or a real-time data source). Media output component 515 may be any component capable of conveying information to user 530. In some embodiments, media output component 515 may include an output adapter, such as a video adapter and/or an audio adapter. An output adapter may be operatively coupled to processor 505 and operatively coupled to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 515 may be configured to present an interactive user interface (e.g., a web browser or client application) to user 530.

In some embodiments, computing device 502 may include an input device 520 for receiving input from user 530. Input device 520 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupled to a remote device, such as DI computing device 120. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer-readable instructions for providing a user interface to user 530 via media output component 515 and, optionally, receiving and processing input from input device 520. A user interface may include, among other possibilities, a web browser and client application. Web browsers enable users 530 to display and interact with media and other information typically embedded on a web page or a website from a web server associated with an administrator of AE system 100 (shown in FIG. 1). A client application allows users 530 to interact with a server application associated with, for example, AE computing device 110 (shown in FIG. 1).

Figure 6:
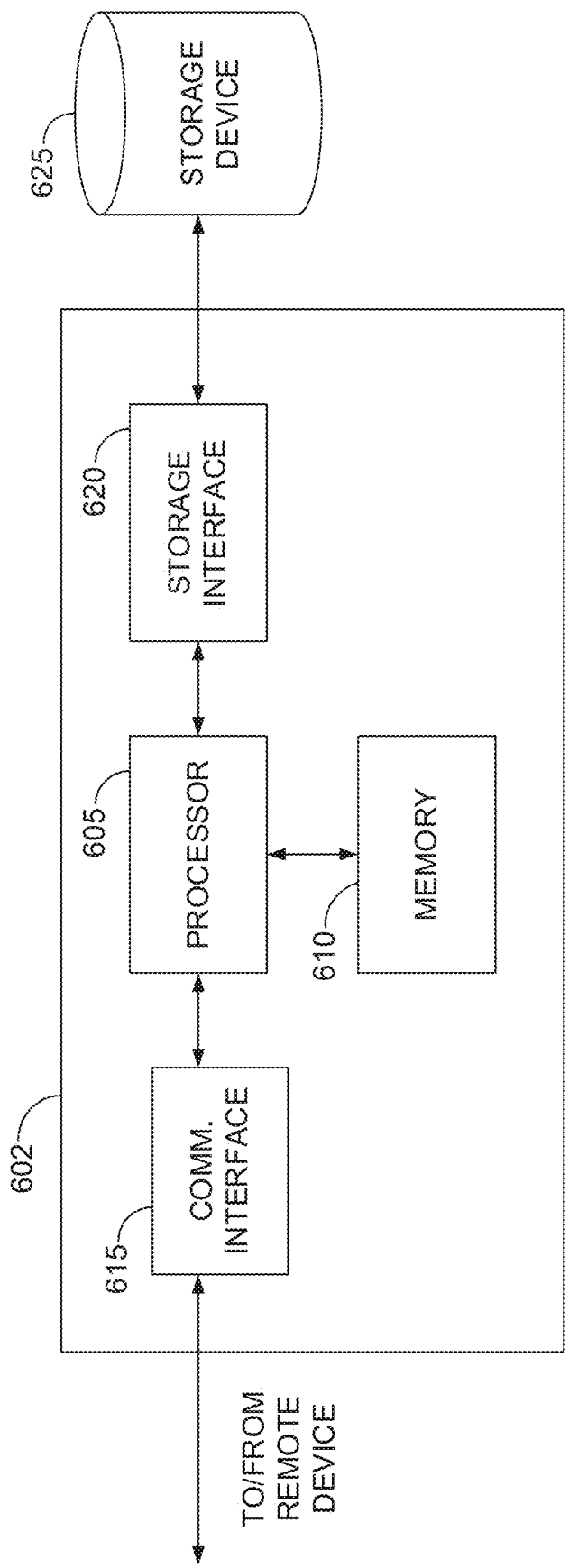
FIG. 6 illustrates an example configuration of a host system for use in the system shown in FIG. 1 in accordance with an embodiment of the present disclosure.

FIG. 6 depicts an exemplary configuration of a host computing device 602, such as AE computing device 110 and DI computing device 120 (shown in FIG. 1). Host computing device 602 may include a processor 605 for executing instructions. Instructions may be stored in a memory area 610, for example. Processor 605 may include one or more processing units (e.g., in a multi-core configuration).

Processor 605 may be operatively coupled to a communication interface 615 such that host computing device 602 may be capable of communicating with a remote device such as computing device 502 (shown in FIG. 5) or another host computing device 602. For example, communication interface 615 may receive requests from computing device 502 via the Internet.

Processor 605 may also be operatively coupled to a storage device 625. Storage device 625 may be any computer-operated hardware suitable for storing and/or retrieving data. In some embodiments, storage device 625 may be integrated in host computing device 602. For example, host computing device 602 may include one or more hard disk drives as storage device 625. In other embodiments, storage device 625 may be external to host computing device 602 and may be accessed by a plurality of host computing devices 602. For example, storage device 625 may include multiple storage units such as hard disks or solid state disks in a redundant array of inexpensive disks (RAID) configuration. Storage device 625 may include a storage area network (SAN) and/or a network attached storage (NAS) system.

In some embodiments, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 5) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 7:
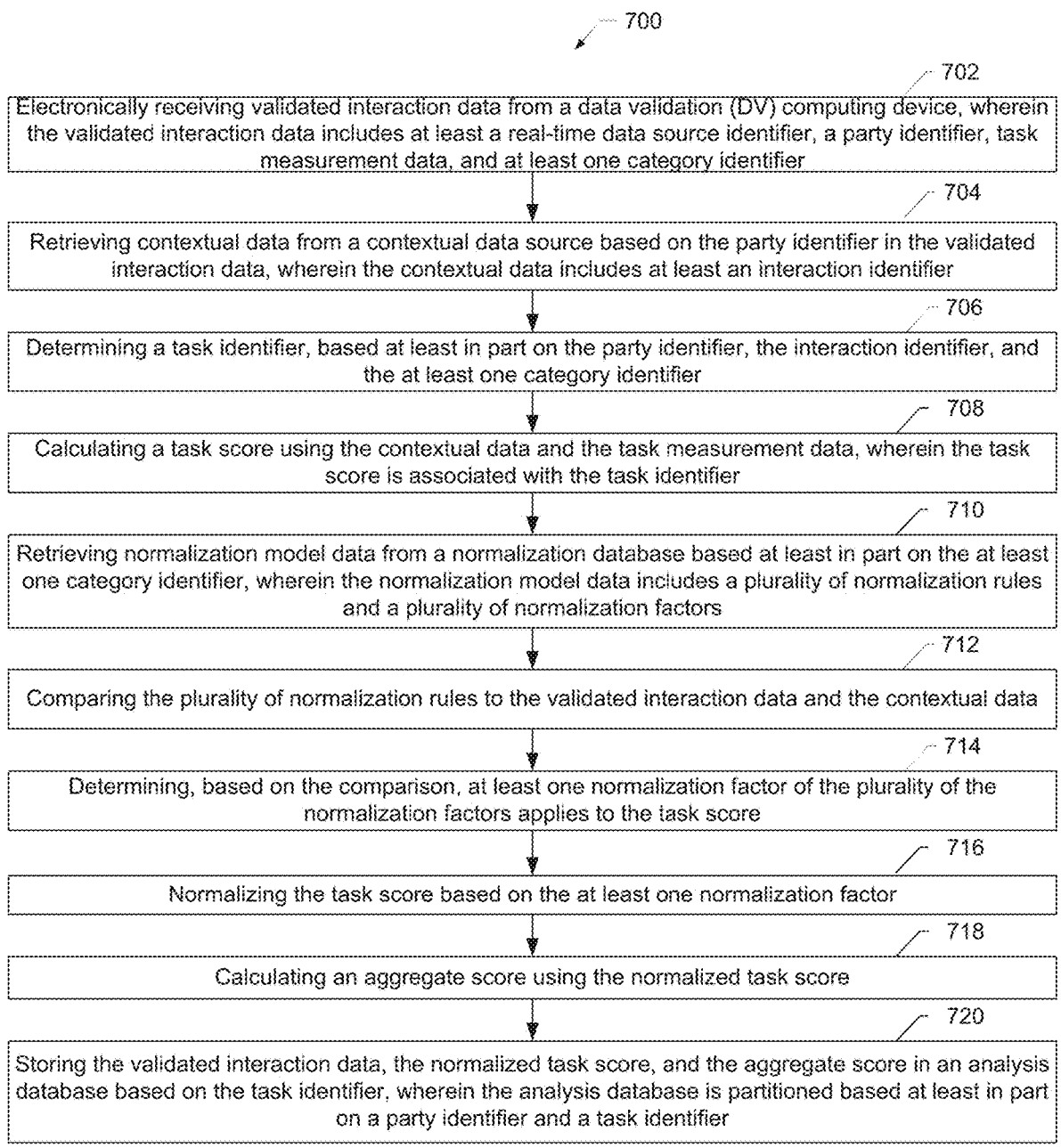
FIG. 7 is a flow diagram of an example method for analyzing and evaluating a data in real-time associated with a performance of parties interacting within a multi-party interaction performed by the AE system shown in FIG. 1.

FIG. 7 is a flow diagram of an example method 700 for analyzing and evaluating data in real-time associated with a performance of parties interacting within a multi-party interaction. In the example embodiment, at least a portion of method 700 is performed by an analysis engine (AE) computing device, such as analysis engine (AE) computing device 110, shown in FIG. 1. In certain embodiments, method 700 may be at least partially performed by another computing device. In other embodiments, method 700 includes additional, fewer, or alternative steps, including those described herein.

Method 700 begins with the AE computing device electronically receiving 702 validated interaction data from a data validation (DV) computing device, wherein the validated interaction data includes at least a real-time data source identifier, a party identifier, task measurement data, and at least one category identifier. Method 700 also includes retrieving 704 contextual data from a contextual data source based on the party identifier in the validated interaction data, wherein the contextual data includes at least an interaction identifier. Method 700 further includes determining 706 a task identifier, based at least in part on the party identifier, the interaction identifier, and the at least one category identifier, calculating 708 a task score using the contextual data and the task measurement data, wherein the task score is associated with the task identifier, and retrieving 710 normalization model data from a normalization database based at least in part on the at least one category identifier, wherein the normalization model data includes a plurality of normalization rules and a plurality of normalization factors. Method 700 also includes comparing 712 the plurality of normalization rules to the validated interaction data and the contextual data, determining 714, based on the comparison, at least one normalization factor of the plurality of the normalization factors applies to the task score, normalizing 716 the task score based on the at least one normalization factor, calculating 718 an aggregate score using the normalized task score, and storing 720 the validated interaction data, the normalized task score, and the aggregate score in an analysis database based on the task identifier, wherein the analysis database is partitioned based at least in part on a party identifier and a task identifier.

Figure 8:
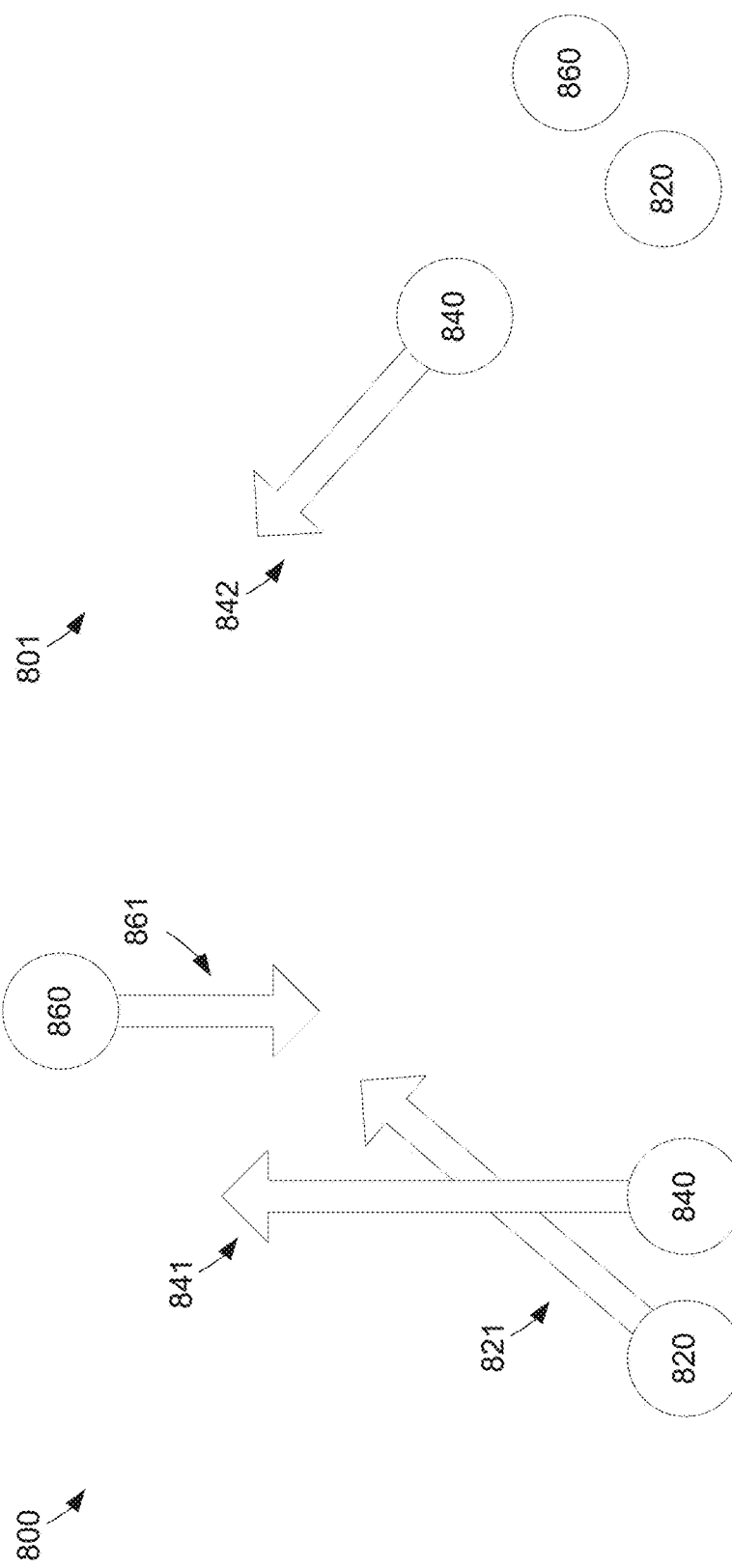
FIG. 8A is a first example schematic diagram of a football play that may be used for analyzing and evaluating a data in real-time associated with a performance of parties interacting within a multi-party interaction using the system shown in FIG. 1.
FIG. 8B is a second example schematic diagram of a football play that may be used for analyzing and evaluating a data in real-time associated with a performance of parties interacting within a multi-party interaction using the system shown in FIG. 1.

FIGS. 8A and 8B are example schematic diagrams of two interactions, including parties, associated with an event.

Specifically, the event includes interaction 800 and interaction 801. The event further includes party 820, party 840, and party 860.

FIG. 8A is an example schematic diagram of interaction 800, including parties 820, 840, and 860. Interaction 800 is included in a set of interactions, or an event. Task measurement 821 is associated with party 820, and indicates a position and direction. Similarly, task measurement 841 is associated with party 840, and task measurement 861 is associated with party 860. Parties 820 and 840 may be associated with an offense category identifier, and party 860 may be associated with a defense category identifier. In certain embodiments, AE computing device 110 (shown in FIG. 1) is configured to receive interaction data including multiple instances of task measurements, such as interaction data 210 or validated interaction data 212 (shown in FIG. 2). In one embodiment, AE computing device 110 receives interaction data including task measurement 821, task measurement 841, and task measurement 861, and the AE computing device 110 is configured to determine a party (e.g., party identifier) associated with each task measurement.

FIG. 8B is an example schematic diagram of interaction 801, including parties 820, 840, and 860 (shown in FIG. 8A). Interaction 801 may be subsequent to interaction 800, and may further be associated with the same event (e.g., associated with the same event identifier). Interaction 801 includes task measurement 842 associated with party 840. In certain embodiments, AE computing device 110 may be configured to determine a category (e.g., category identifier) associated with interaction 801 based on task measurement 842. For example, AE computing device 110 may store task measurement 842 as interaction addendum data associated with the identifier of interaction 801 in analysis database 122.

In the example embodiment, during the analysis data collection process, AE computing device 110 or analysts associated with client computing devices 132 (both shown in FIG. 1) analyze a video data file to assign task scores for each player on offense (e.g., party 840) and defense (e.g., party 860). For the offensive line players, a task score is assigned for their performance of their respective blocking assignment. Table 1 is an example list of abbreviations that are used for reference. Additional abbreviations may be apparent to those skilled in the art, such as abbreviations associated with a specific task or event. Table 2 includes an example performance criterion for a play-side tackle (PST) for the outside zone running play. In the example embodiment, the performance criteria includes five predefined task scores within a negative one to positive one score range that can be assigned to the play-side tackle for the play. The middle task score is a zero and is indicative of 'as expected' or 'normal' performance of the blocking assignment. Accordingly, the negative scores indicate a poor performance of the blocking assignment and the positive scores indicate a good performance. Each task score includes a description that defines what level of performance corresponds to the task score. In other embodiments, a different range of task scores, number of task scores, and/or different definitions of the task scores may be used.

TABLE 1

| Abbreviation | Full Name |
| --- | --- |
| QB | Quarterback |
| RB | Running Back |
| PS-TE | Play-Side Tight End |
| PST | Play-Side Tackle |
| PSG | Play-Side Guard |
| C | Center |
| BSG | Back-Side Guard |
| BST | Back-Side Tackle |
| BS-TE | Back-Side Tight End |
| RILB | Right Inside Linebacker |

TABLE 2

| Position | Responsibility | −1 Play | −0.5 Play | 0 Play | 0.5 Play | 1 Play |
| --- | --- | --- | --- | --- | --- | --- |
| PST | Combo with PSG; 5-tech to RILB | Surrenders immediate penetration to threaten ball carrier at or behind LOS | Fails to sustain block on 5-tech or control on exchange to allow release to RILB; Allows 5-tech or RILB to threaten ball carrier just past LOS | Controls 5-tech on combo with PSG to allow release to RILB | Controls play-side should of 5-tech to sustain play-side gap; On release climbs to control RILB & maintain play-side gap at second level | Drives 5-tech on combo with PSG back to LBs or drives RILB at second level out of play to threaten integrity of defense |

With respect to FIG. 1, AE computing device 110 is configured to generate and update an analysis data file based on the received game data. In particular, the analysis data file includes at least a portion of the collected base play data, player participation data, and analysis data. The analysis data file includes data file partitions of user-editable data fields for each play of the game. In the example embodiment, AE computing device 110 determines a type of play (e.g., passing, running, blown play, special teams, etc.) from the base play data for at least some of the plays and updates the analysis data file to include contextual data fields specific to the determined type of play. In one example, AE computing device 110 analyzes the base play data for play type identifiers to determine the play type. In another example, AE computing device 110 automatically determines a play type based on indirect information, such as other plays or indicators. In one example, AE computing device 110 automatically determines a kick-off follows after a point-after-attempt (PAT) or halftime.

Once task scores have been assigned for a play for each participating player, the task scores are normalized by determining one or more normalization factors representative of game conditions for the task from the analysis data file for each task. The normalization factors may be determined, for example, from the stored base play data, player participation data, category identifiers, and analysis data of the analysis data file, such as down and distance, quarterback drop depth (e.g., three steps or seven steps), and pressure applied to the quarterback. AE computing device 110 is configured to use the normalization factors to locate historical task scores that match the normalization factors. The historical task scores are averaged together to generate a normalization model data. The normalization model data is applied to the task score during normalization to generate a normalized task score. In some embodiments, a replacement factor is also determined for a replacement level player and applied to the task score to generate the normalized task score.

For example on a three-step drop for a quarterback, it may be difficult for a pass rusher to get a positive task score. On a seven-step drop, it is comparatively easier to get a positive pass rush task score, so these game conditions are normalized differently. On a play with a seven-step drop, a pass rusher on average gets a +0.10 task score, and on a play with a three-step drop, a pass rusher on average gets a +0.04 task score. If pass rushers were normalized just based on the drop depth of the quarterback, 0.10 from their pass rush task scores would be subtracted for every seven-step drop that the pass rushers participated in, and 0.04 would be subtracted for every three-step drop that the pass rushers participated in.

Similarly, it may be relatively easier to get defensive pressure at some positions compared to others. In one example, a nose tackle averages a pass rush task score of +0.049 per pass rush while a middle linebacker averages +0.078 per pass rush. If normalized just by position, 0.049 is subtracted from a pass rush task score at the nose tackle position and 0.078 is subtracted from a pass rush task score at the middle linebacker position. By combining multiple normalization factors, such as player position and quarterback drop depth, normalization of task scores using a normalization model data facilitates normalizing the player's performance relative to historical player performance in similar play conditions, thereby enhancing performance evaluation.

In the example embodiment, the normalized task scores are averaged over a corresponding number of plays a player participated in to generate a performance grade for the player. In some embodiments, the performance grade is converted into a different scale or format for display. For example, the converted performance score may rate players on a 0-100 scale. AE computing device 110 stores the normalized task scores and the performance grades with the analysis data file. In at least some embodiments, the performance grades may be used to calculate a season or career performance grade for each player. That is, performance grades for a player from a plurality of games are used to calculate a season or career performance grade for the player.

In the example embodiment, AE computing device 110 is configured to transmit the performance grades to one or more client computing devices (e.g., 132) associated with end users to cause the performance grades to be displayed to the end users. The end users may use the performance grades to influence decisions, such as fantasy football transactions, contract negotiation, and player evaluation. In at least some embodiments, AE computing device 110 transmits the analysis data file to an end user. The analysis data file may be added to the metadata of the video data file to facilitate navigation within the video data file.

In some embodiments, the analysis data file is stored in one or more analysis data packages (not shown) by AE computing device 110. The analysis data packages represent a plurality of games and include a plurality of analysis data files. In some embodiments, the analysis data packages include portions of analysis data files (e.g., an analysis data package associated with a particular player). In one example, the analysis data package may represent a season or a player's career. The analysis data package is used by a client computing device to enable searching for and filtering data within the stored analysis data files. In at least some embodiments, AE computing device 110 is configured to identify trends or other analytics for the analysis data package. The identified trends may include trends in performance grades, task scores, game data, and any other data stored in the analysis data files. These identified trends may be provided to an end user for review. In certain embodiments, the analysis data package is linked to one or more event data files to enable an end user to navigate the event data files using the analysis data package.

Figure 9:
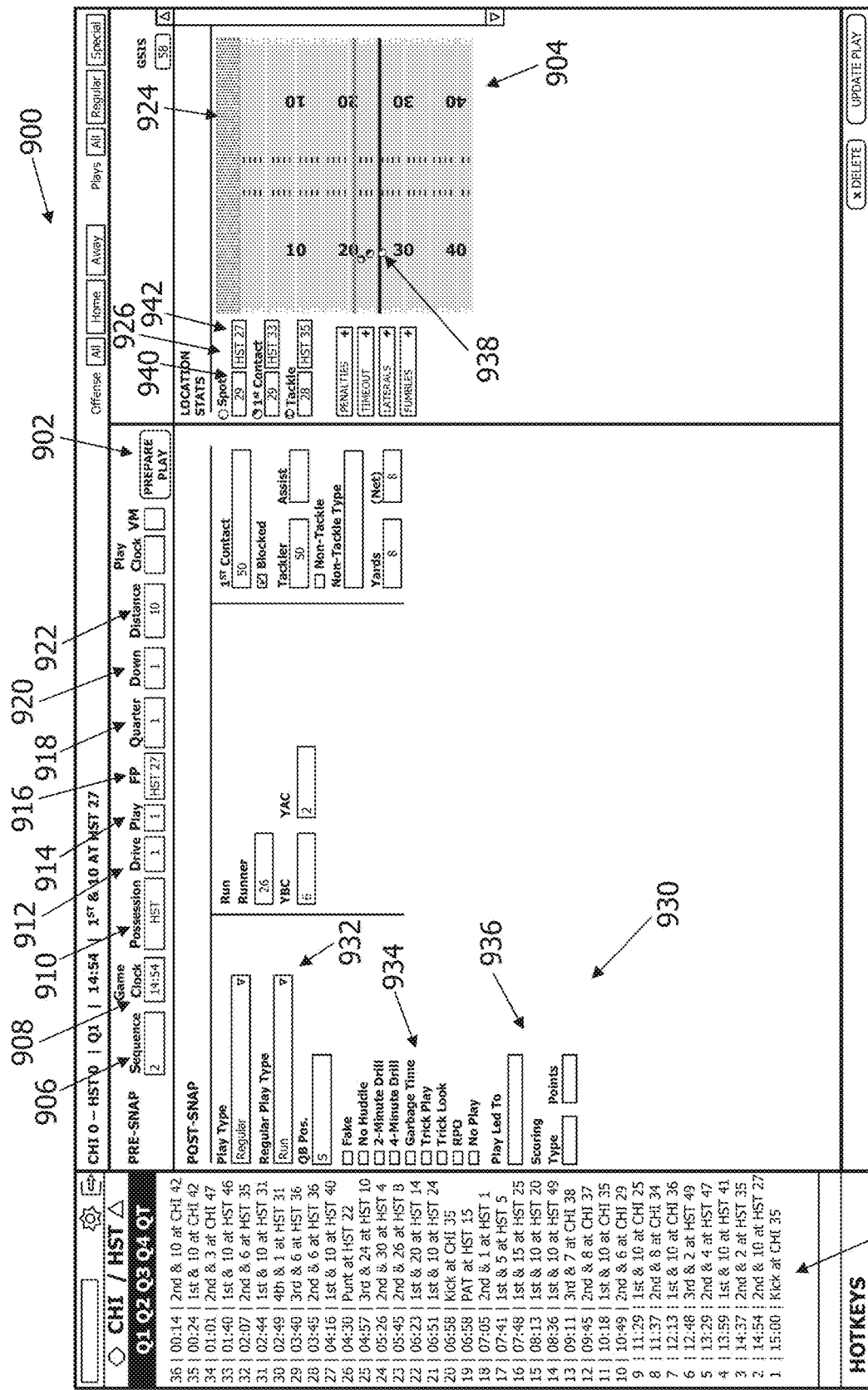
FIG. 9 illustrates an example user interface for displaying base data associated with a football game.

FIG. 9 illustrates an example user interface 900 used by AE system 100 (shown in FIG. 1) to input base data associated with a football game. AE system 100 is configured to display user interface 900 on computing devices associated with real-time data sources 142, 144, and 146 (all shown in FIG. 1) and collect from user interface 900 the base data. User interface 900 receives the base data and displays the base data. User interface 900 includes a pre-snap entry section 902 and a map entry section 904. Pre-snap entry section 902 and map entry section 904 may be used to input data into user interface 900. Pre-snap entry section 902 includes a sequence of a task 906, a game clock 908, a team possession 910, a drive 912, a play 914, a field position 916, a quarter 918, a possession down 920, a distance from the line to gain 922. Map entry section 904 includes a map of a football field 924 and statistics section 926. User interface 900 also includes a task tracker 928 and a post-snap entry section 930. Map of the football field 924 may be an interactive graphical user interface (GUI) that includes a graphics in a plurality of colors (e.g., color-coded graphics). Each of the graphics in the plurality of colors may represent players, yards on the football field, a line of scrimmage, the line to gain, a distance of throw, a distance of a run, and/or other data that may input and/or output from user interface 900. AE system may update map of the football field 924 by using data input from pre-snap entry section 902, map entry section 904, task tracker 928, and a post-snap entry section 930.

In an example, user interface 900 receives and displays base data associated with a football game between Chicago (CHI) and Houston (HST). Task tracker 928 displays that task 2 of the football game was a first down possession at 10 yards from the line to gain, and more specifically, at the 27-yard of HST's side of the football field. Task tracker 928 also displays that task 2 was performed at 14 minutes and 54 seconds remaining in a first quarter of the football game. Post-snap entry section 930 includes one or more drop downs 932, one or more check boxes 934, and one or more entry fields 936. Task tracker 928 is in communication with pre-snap entry section 902, map entry section 904, and post-snap entry section 930. Continuing with the above example, map entry section 904 displays, in football field 924, at least one player 938 at the 27-yard of HST's side of the football field. Map entry section 904 also displays, in statistics section 926, a number 940 associated with the at least one player 938 performing task 2 and at least one position 942 of the at least one player 938.

Figure 10:
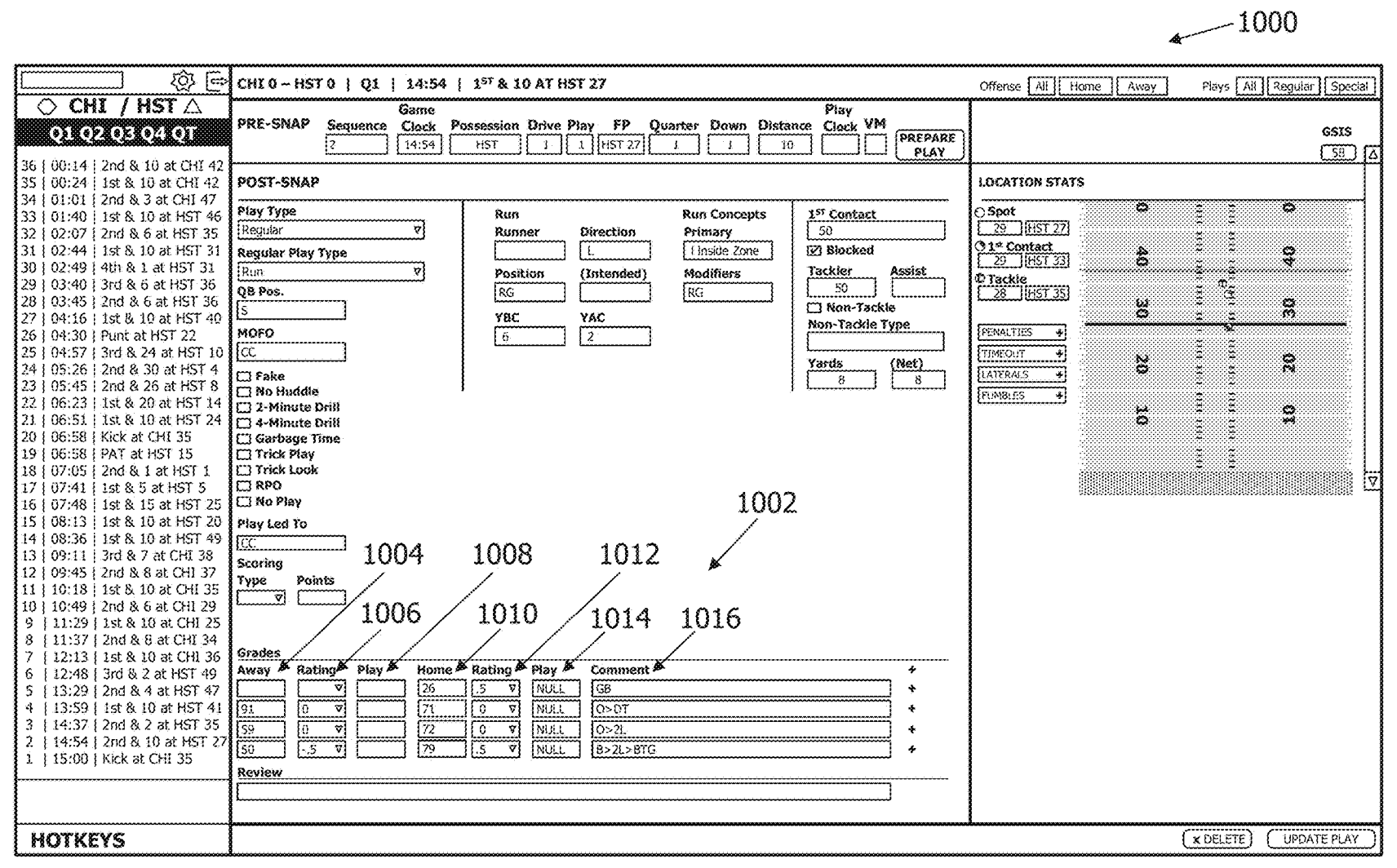

FIG. 10 is an example user interface 1000 used by AE system 100 (shown in FIG. 1) to input base data associated with a football game. User interface 1000 is similar to user interface 900 (shown in FIG. 9) and includes the data fields of user interface 900. User interface 1000 also includes a task measurement section 1002. Task measurement section 1002 includes the following data fields: away team player number 1004, away team player rating 1006, away player play 1008, home team player number 1010, home team player rating 1012, home team player play 1014, and comment field 1016. A real-time source, such as real-time data sources 142, 144, and 146 (all shown in FIG. 1) inputs data (i.e., task measurement data and base data) into the data fields of task measurement section 1002. AE system 100, and more specifically, AE computing device 110 (shown in FIG. 1) is configured to receive the task measurement data and the base data from user interface 1000 and store the task measurement data and base data within a database (e.g., MySQL database). AE computing device 110 parses the task measurement data and base data, and identifies and assigns at least one category identifier to the task measurement data based on the parsed task measurement and base data. Category identifiers may be associated with the following categories: Passing, Rushing, Pass Blocking, Run Blocking, Receiving, Screen Block, Offensive Penalty, Pass Rushing, Run Defense, Coverage, Defensive Penalty, Kickoff Penalties, Kicking, Kick Return, Kickoffs, Punt Penalties, Punting, Punt Returns, Punts, Field Goal Penalties, Field Goal, Field Goals, Pass Defense, and Scramble.

Figure 11A:
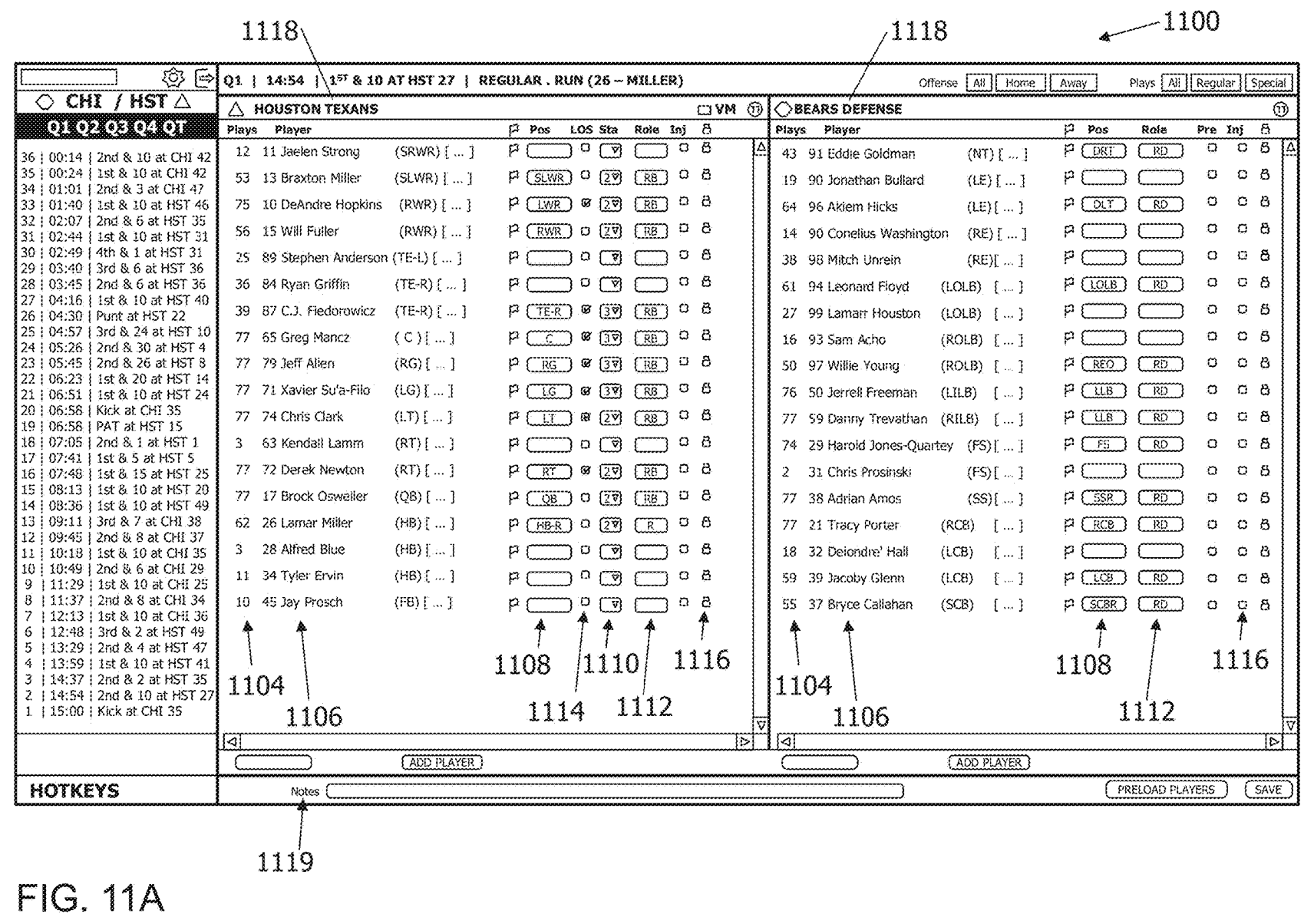
Figure 11B:
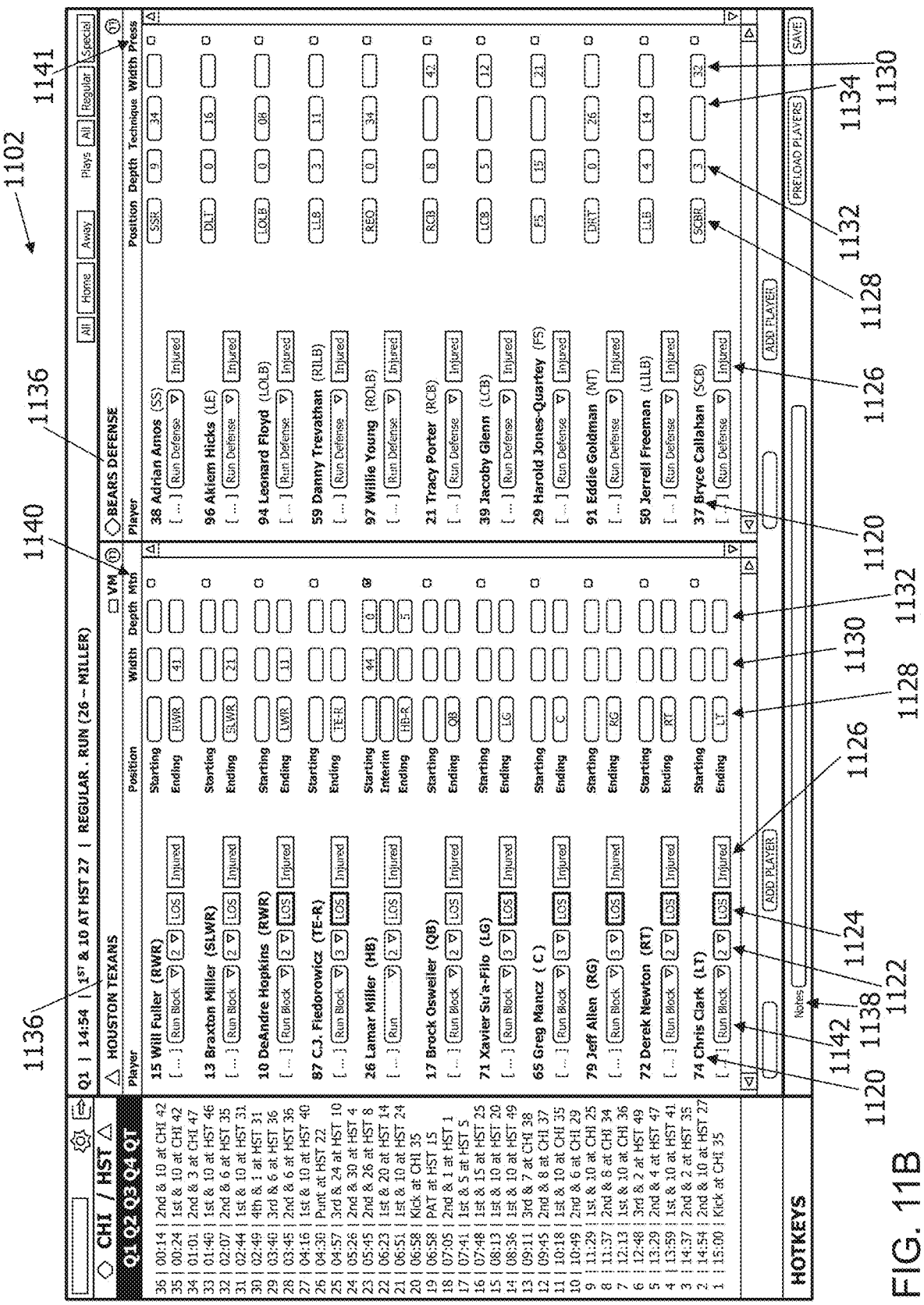
FIG. 11B illustrates a second example user interface to display party data associated with an interaction.

FIGS. 11A and 11B are examples of user interfaces 1100 and 1102, respectively, used by AE system 100 (shown in FIG. 1) to display parties (e.g., players) participation in a multi-interaction (e.g., event or game). With reference to FIG. 11A, user interface 1100 displays a number of plays (e.g., events) for each player 1104 (e.g., party), a player identifier 1106 which includes a player name and jersey number. In some embodiments, player identifier 1106 further includes party notes, such as information to distinguish the player from other players on the field. In addition, user interface 1100 displays a player position 1108, a stance indicator 1110, a player's primary role on the given task 1112 (e.g., category identifier), line of scrimmage (LOS) check box 1114, injury check box 1116, a team identifier 1118, and a notes field 1119. Notes field 1119 includes additional interaction data associated with the player and/or play (e.g., interaction addendum data).

With reference to FIG. 11B, user interface 1102 displays a player identifier 1120, role on the play 1142, a stance indicator 1122, an LOS indicator 1124, and a player injury indicator 1126. In addition, user interface 1102 includes data fields associated with offensive players, such as a starting and/or ending pre-snap position 1128, width 1130, depth 1132, and motion 1140. In certain embodiments, AE computing device 110 is configured to identify pre-snap shifts in player formations and determine if a player is in motion as the ball is snapped. In one embodiment, AE computing device 110 identifies pre-snap shifts (e.g., interactions) based at least in part on pre-snap position 1128, width 1130, depth 1132, and motion 1140. For example, AE computing device 110 may determine that a player moved from the edge of the field towards the center of the field in a pre-snap shift. User interface 1102 includes data fields associated with defensive players, such as position 1128, depth 1132, technique 1134, width 1130, and press coverage indicator 1141. Technique 1134 refers to the alignment of a player on the defensive line against their offensive line counterpart and includes a press coverage indicator 1141. User interface 1102 also includes a team identifier 1136, and a notes field 1138. User interfaces 1100 and 1102 enable real-time data sources to input player participation (PP) data into AE system 100. More specifically, some of the data displayed in user interface 1102 is input from user interface 1100 and may enable a real-time data source to verify the input from user interface 1100.

AE system 100, and more specifically, AE computing device 110 (shown in FIG. 1) is configured to build a matrix of players by category identifier, such as the category identifiers associated with the categories listed in FIG. 10. For example, AE computing device 110 may fill the matrix with 0's such that if a player was in coverage on a given play that all other tasks are null but coverage is 0. 0 is the base task measurement for a given player. All players start at 0 on a given play.

Subsequently, AE computing device 110 is configured to overlay the task that has assigned at least one category identifier (described in FIG. 10) on the data in the matrix. For example, if the PP data indicates that a player is in coverage, but the player actually also got a pass rush task measurement, AE computing device 110 is configured to assign to both the coverage and pass rush measurements their respective categories. The AE computing device is also configured to add or subtract to the task measurements with assigned categories a normalization factor based on normalization model data.

AE computing device 110 is further configured to store for each player a raw task measurement, a factor number associated with the normalization factor, and a computation of a normalized task score, which is an addition of the raw task measurement and the factor number. For each player in each game, AE computing device 110 adds the normalized task score per task and stores the normalized task scores within a table (e.g., a normalized table within normalization database 121 as illustrated in FIG. 2) such that a player may have a normalized task score across any number of tasks during a multi-interaction (e.g., a game) and/or numerous multi-interaction (e.g., a partial or full season). AE computing device 110 is also configured to retrieve, per player per task, the normalized task scores from the normalized table and compare the normalized task score to an average of normalized task score for the same task in order to generate a ranking of 0-100 of the player.

In some embodiments, AE computing device 110 is configured to collect base data and task measurement data once every 10th of a second for all players whether the player are in the field or in the sideline. AE computing device 110 is also configured to filter the base data and the task measurement data to more efficiently compute the normalized scores. AE computing device 110 is further configured to receive height data (distance from the ground) to determine a players' stances or techniques. AE computing device 110 is also configured to use base data from pre-snap entry section 902 (shown in FIG. 9) to determine a shift (e.g., movement) when a ball is stationary as the ball is snapped) through to motion (e.g., receiver motion as the ball is snapped). AE computing device 110 may use the base data from pre-snap entry section 902 to identify shifting in, for example, defensive patterns (e.g., reaction to the movements in the offensive line).

AE computing device 110 is also configured to determine a plurality of routes, for example, the routes a receiver ran and to gauge aspects of the run, such as speed of the receiver and receiver's running strategies and techniques. For example, AE computing device 110 may generate a response to questions, such as "Does the receiver break to the inside or outside? Does the movement of the receiver correlate with the receiver's pre-snap position? If receiver A does X, does another receiver Y do B? Does receiver X have more success against defender J if he breaks in a certain direction?" AE computing device is further configured to identify the separation between a receiver and defenders in coverage of the receiver, a defensive scheme (e.g., man, zone—in other words, did a defender track a receiver as he moved pre-snap or did?), how well an offensive line did in pass protection, how well was the pocket protected (e.g., did the pocket collapse in a certain way (left side, right side), how long did they hold that protection for?), the correlation of the protected pocket and the task measurements that the offensive line get in pass blocking and the defensive line get in pass rushing.

The user interfaces described herein include some examples of how the user interfaces may be displayed and input data. These examples are not intended to limit the data display and input of the user interfaces in any way. Rather, these user interface are used to display and input interactive data for numerous multi-party interactions. For example, a run play may be displayed differently in the map entry section than a pass play in the same section.

In the example embodiment, real-time data source refers to a computing device associated with a collector, and a client computing device refers to a computing device associated with an end-user. For example, a collector may observe a football game and record task measurements using a computing device, and an end-user may retrieve analysis data using the client computing device.

In the example embodiment, where the AE computing device is configured to analyze a football game, event refers to a football game, interaction refers to a football play, party refers to a football player, and task refers to a play activity of a player (i.e., a player's actions) within a specific football play. Additionally, a category may be associated with a football play or a football player indicating a player's position or play type. In certain embodiments, addendum data (e.g., task addendum data, interaction addendum data) may be stored based on categories including player positions and play types.

In the example embodiment, task measurement data refers to a specific data point input by a collector regarding a football player, such as a yard measurement or player location, and contextual data refers to information including a player roster. Task score refers to a score associated with a play activity (e.g., task), such as blocking or passing. Interaction data may include any combination of task measurement data and task score data, such as a set of measurements representing all player activity within a football play.

In the example embodiment, normalization rules include determining a normalization factor associated with a task score, such as determining a normalization factor based on the type of play and the position of the player, and normalization factors include adjusting task scores based on aggregates of comparable task scores. For example, comparable task scores may include task scores having a similar player position and/or type of play.

Output analysis data includes, in some embodiments, score data such as normalized task scores and aggregate scores. In the example embodiment, output analysis includes normalized task scores representing a score of a player's action, such as a blocking or passing tasks, where the score is normalized relative to comparable task scores, and aggregate scores include an overall player score, such as a player ranking for a game, a series of games, and/or an entire season (e.g., a football season).

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications, or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An analytics engine (AE) computing system for analyzing and evaluating data in real-time associated with a performance of parties interacting within a multi-party interaction, the AE computing system comprising at least one analytics engine (AE) computing device comprising a processor and a memory communicatively coupled to the processor, the processor programmed to:
generate a normalization model based on a plurality of normalization rules;
store the normalization model in a normalization database;
update the normalization model with one or more normalization factors;
electronically receive, from a data validation (DV) computing device, validated interaction data of the multi-party interaction including at least a real-time data source identifier, a party identifier, task measurement data, and at least one category identifier, wherein the multi-party interaction includes a plurality of interactions, wherein the validated interaction data is generated from real-time video data of the multi-party interaction;

identify a first party identifier associated with a first interaction of the plurality of interactions, wherein the first party identifier includes a position associated with a first party during the first interaction;

retrieve contextual data from a contextual data source based on the first party identifier in the validated interaction data, wherein the contextual data includes at least an interaction identifier associated with the first interaction;

execute the normalization model with the validated interaction data and the contextual data to determine at least one normalization factor to apply to a task score of the first party, wherein the at least one normalization factor is based on the position associated with the first party and the at least one category identifier for the first interaction;

calculate an aggregate score based on the at least one normalization factor; and generate a display of one or more aggregate scores associated with one or more parties in the multi-party interaction.

2. The AE computing system of claim 1, wherein the processor further programmed to:
normalize the task score based on the at least one normalization factor; and
calculate an aggregate score using the normalized task score.

3. The AE computing system of claim 2, wherein the processor further programmed to store the validated interaction data, the normalized task score, and the aggregate score in an analysis database based on a task identifier, wherein the analysis database is partitioned based at least in part on a party identifier and a task identifier.

4. The AE computing system of claim 3, wherein the analysis database includes a task table indexed using task identifiers, an interaction table indexed using interaction identifiers, and a party table indexed using party identifiers.

5. The AE computing system of claim 4, wherein the processor further programmed to map, using the normalization rules, the category identifiers to one or more normalization factors based on the party identifiers.

6. The AE computing system of claim 5, wherein storing the validated interaction data further includes generating database instructions configured to create a task record in the task table based on the determined task identifier, and the database instructions further include the validated interaction data, the normalized task score, and the aggregate score.

7. The AE computing system of claim 1, wherein the task identifier includes a combination of the interaction identifier and the party identifier.

8. The AE computing system of claim 1, wherein the processor further programmed to:
analyze the validated interaction data;
determine a missing task measurement not included in the validated interaction data; and
transmit a notification message to at least one of a real-time data source and the DV computing device, wherein the notification message includes a task measurement identifier associated with the missing task measurement.

9. The AE computing system of claim 1, wherein the processor further programmed to:
receive a first task score for a first task identifier from a first data source;
receive a second task score for the first task identifier from a second data source;
compare the first task score and the second task score;
if the first task score and the second task score match, verify and store the first task score; and
if the first task score and the second task score do not match, identify and store one or more differences based on the comparison.

10. A computer-implemented method for analyzing and evaluating data in real-time associated with a performance of parties interacting within a multi-party interaction, the method implemented using analytics engine (AE) computing device in communication with a memory, the method comprising:
generating a normalization model based on a plurality of normalization rules;
storing the normalization model in a normalization database;
updating the normalization model with one or more normalization factors;
electronically receiving, from a data validation (DV) computing device, validated interaction data of the multi-party interaction including at least a real-time data source identifier, a party identifier, task measurement data, and at least one category identifier, wherein the multi-party interaction includes a plurality of interactions, wherein the validated interaction data is generated from real-time video data of the multi-party interaction;
identifying a first party identifier associated with a first interaction of the plurality of interactions, wherein the first party identifier includes a position associated with a first party during the first interaction;
retrieving contextual data from a contextual data source based on the first party identifier in the validated interaction data, wherein the contextual data includes at least an interaction identifier associated with the first interaction;
execute the normalization model with-the validated interaction data and the contextual data to determine at least one normalization factor to apply to a task score of the first party, wherein the at least one normalization factor is based on the position associated with the first party and the at least one category identifier for the first interaction;
calculating an aggregate score based on the at least one normalization factor; and
generating a display of one or more aggregate scores associated with one or more parties in the multi-party interaction.

11. The method of claim 10 further comprising:
normalizing the task score based on the at least one normalization factor; and
calculating an aggregate score using the normalized task score.

12. The method of claim 11 further comprising storing the validated interaction data, the normalized task score, and the aggregate score in an analysis database based on a task identifier, wherein the analysis database is partitioned based at least in part on a party identifier and a task identifier.

13. The method of claim 12, wherein the analysis database includes a task table indexed using task identifiers, an interaction table indexed using interaction identifiers, and a party table indexed using party identifiers.

14. The method of claim 13 further comprising mapping, using the normalization rules, the category identifiers to one or more normalization factors based on the party identifiers.

15. The method of claim 13, wherein storing the validated interaction data further comprises generating database instructions configured to create a task record in the task table based on the determined task identifier, and the database instructions further include the validated interaction data, the normalized task score, and the aggregate score.

16. The method of claim 10, wherein the task identifier includes a combination of the interaction identifier and the party identifier.

17. The method of claim 10 further comprising:
analyzing the validated interaction data;
determining a missing task measurement not included in the validated interaction data; and
transmitting a notification message to at least one of a real-time data source and the DV computing device, wherein the notification message includes a task measurement identifier associated with the missing task measurement.

18. The method of claim 10 further comprising:
receiving a first task score for a first task identifier from a first data source;
receiving a second task score for the first task identifier from a second data source;
comparing the first task score and the second task score;
if the first task score and the second task score match, verifying and storing the first task score; and
if the first task score and the second task score do not match, identifying and storing one or more differences based on the comparison.

19. A non-transitory computer-readable storage media having computer-executable instructions embodied thereon, wherein when executed by an analytics engine (AE) computing device having at least one processor coupled to at least one memory device, the computer-executable instructions cause the processor to:
generate a normalization model based on a plurality of normalization rules;
store the normalization model in a normalization database;
update the normalization model with one or more normalization factors;
electronically receive, from a data validation (DV) computing device, validated interaction data of a multi-party interaction including at least a real-time data source identifier, a party identifier, task measurement data, and at least one category identifier, wherein the multi-party interaction includes a plurality of interactions, wherein the validated interaction data is generated from real-time video data of the multi-party interaction;
identify a first party identifier associated with a first interaction of the plurality of interactions, wherein the first party identifier includes a position associated with a first party during the first interaction;
retrieve contextual data from a contextual data source based on the first party identifier in the validated interaction data, wherein the contextual data includes at least an interaction identifier associated with the first interaction;
execute the normalization model with-the validated interaction data and the contextual data to determine at least one normalization factor to apply to a task score of the first party, wherein the at least one normalization factor is based on the position associated with the first party and the at least one category identifier for the first interaction;
calculate an aggregate score based on the at least one normalization factor; and
generate a display of one or more aggregate scores associated with one or more parties in the multi-party interaction.

20. The computer-executable instructions of claim 19, the computer-executable instructions further cause the processor to:
analyze the validated interaction data;
determine a missing task measurement not included in the validated interaction data; and
transmit a notification message to at least one of a real-time data source and the DV computing device, wherein the notification message includes a task measurement identifier associated with the missing task measurement.

* * * * *